United States Patent [19]

Sederlund et al.

[11] Patent Number: 5,555,424

[45] Date of Patent: Sep. 10, 1996

[54] EXTENDED HARVARD ARCHITECTURE COMPUTER MEMORY SYSTEM WITH PROGRAMMABLE VARIABLE ADDRESS INCREMENT

[75] Inventors: Edward R. Sederlund, Saginaw; Robert J. Lindesmith, Midland; Larry A. Root, Midland; Wayne P. Dupree, Midland; Lowell V. Thomas, West Bloomfield, all of Mich.

[73] Assignee: The Dow Chemical Company, Midland, Mich.

[21] Appl. No.: 319,453

[22] Filed: Oct. 6, 1994

[51] Int. Cl.⁶ ............................. G06F 13/00; G06F 12/00
[52] U.S. Cl. ..................... 395/800; 395/402; 395/405; 364/243.3; 364/246.4; 364/246.5; 364/251.2; 364/DIG. 1
[58] Field of Search ................................. 395/800, 775, 395/725, 400, 425, 375, 325, 402, 405, 842; 364/DIG. 1, DIG. 2

[56] References Cited

U.S. PATENT DOCUMENTS

| | | | |
|---|---|---|---|
| 3,626,374 | 12/1971 | Chinlund | 395/405 |
| 3,705,389 | 12/1972 | Krock et al. | 395/775 |
| 3,794,980 | 2/1974 | Cogar et al. | 395/375 |
| 3,905,023 | 9/1975 | Perpiglia | 395/182.04 |
| 4,430,708 | 2/1984 | Isaman | 395/375 |
| 4,493,020 | 1/1985 | Kim et al. | 395/375 |
| 4,494,187 | 1/1985 | Simpson | 364/200 |
| 4,566,595 | 1/1986 | Fustier | 209/545 |
| 4,587,632 | 5/1986 | Ditzel | 395/421.03 |
| 4,608,634 | 8/1986 | Caudel et al. | 395/375 |
| 4,608,661 | 8/1986 | Sasaki | 395/286 |
| 4,747,039 | 5/1988 | Murray | 395/481 |
| 4,748,439 | 5/1988 | Robinson et al. | 340/146.2 |
| 4,751,675 | 6/1988 | Knauer | 365/78 |
| 4,787,062 | 11/1988 | Nei et al. | 395/500 |
| 4,791,550 | 12/1988 | Stevenson et al. | 395/650 |
| 4,891,787 | 1/1990 | Gifford | 395/375 |
| 4,918,586 | 4/1990 | Niimura et al. | 395/429 |
| 4,964,046 | 10/1990 | Mehrgardt et al. | 395/800 |
| 4,992,934 | 2/1991 | Portanova et al. | 395/800 |
| 5,034,887 | 7/1991 | Yasui et al. | 395/800 |
| 5,051,940 | 9/1991 | Vassiliadis et al. | 364/736 |
| 5,081,573 | 1/1992 | Hall et al. | 395/800 |
| 5,084,836 | 1/1992 | Yamaguchi | 395/800 |
| 5,301,340 | 4/1994 | Cook | 395/800 |
| 5,329,631 | 7/1994 | Ishibashi et al. | 395/402 |
| 5,471,640 | 11/1995 | McBride | 395/842 |

OTHER PUBLICATIONS

Mini/Micro computer design—Kraft & Toy—Prentice Hall publications.
Microprogrammable Computer Architectures—Alan B. Salisbury—1976.
i860 Microprocessor Architecture—Neal Margulis—1990.

Primary Examiner—Meng-Ai T. An
Attorney, Agent, or Firm—William J. Coughlin; Dale H. Schultz

[57] ABSTRACT

An extended Harvard architecture memory system which features an address store for containing an ordered sequence of program memory addresses, and a value store for containing a series of related data value sets. Each of the addresses contained in the address store is associated with a distinct set of instructions, such as a subroutine, that is contained in the program memory. The address store may also contain the address of one or more instruction arguments that are, in turn, contained in the value store or in a separate data memory. Both the address store and the value store are preferably connected to the same data communication path which is used by the data memory of the computer. The value store also includes a logic interface for enabling a plurality of different address increments to be programmably selected.

9 Claims, 25 Drawing Sheets

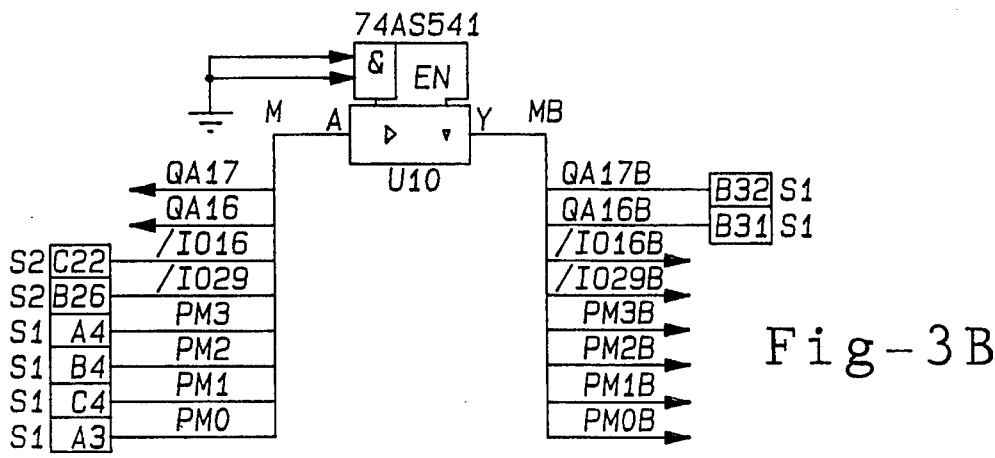
Fig-3B
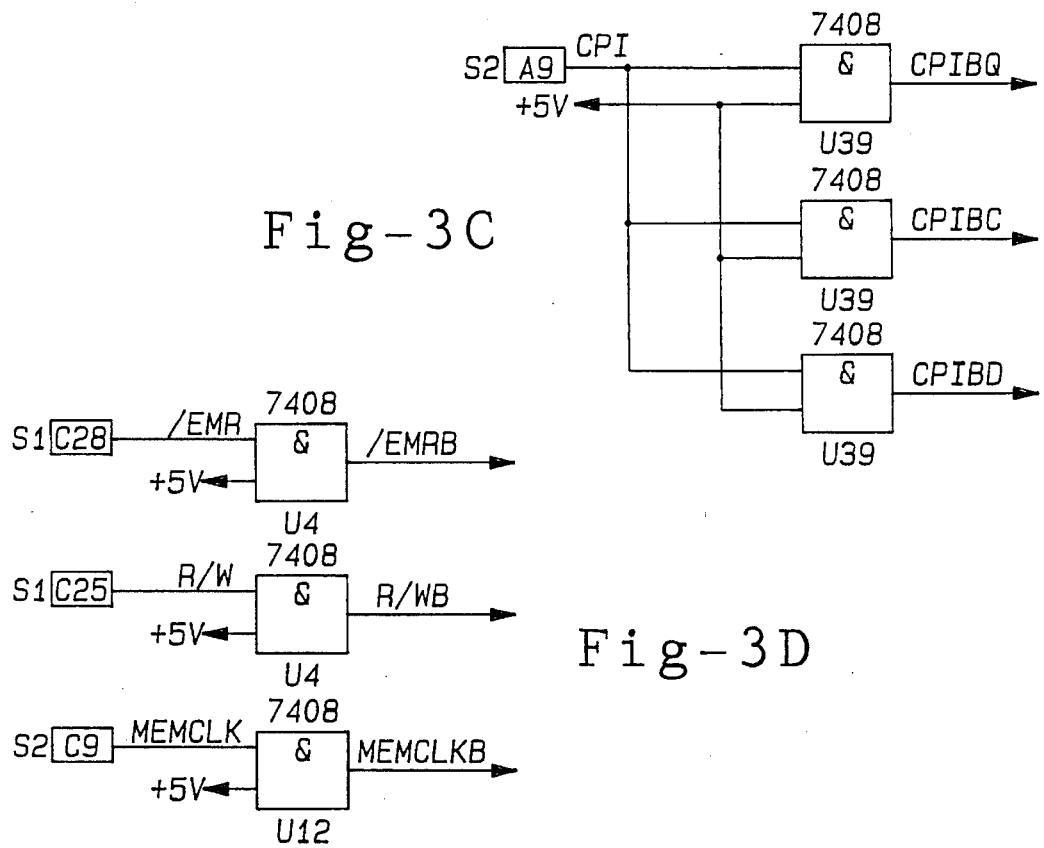
Fig-3C
Fig-3D
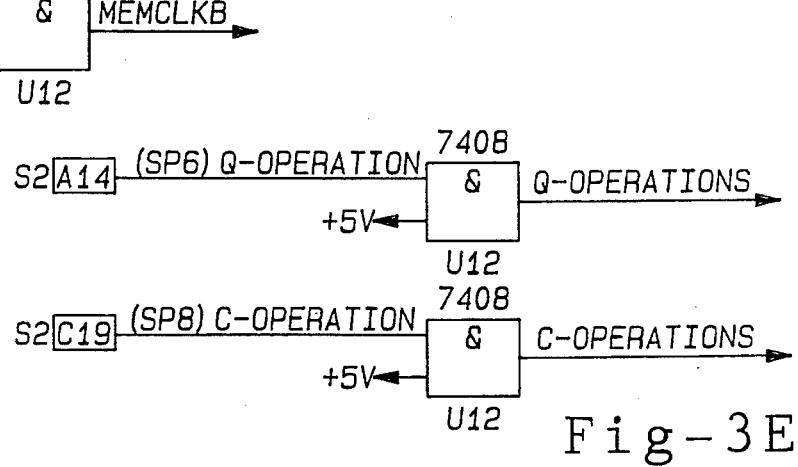
Fig-3E

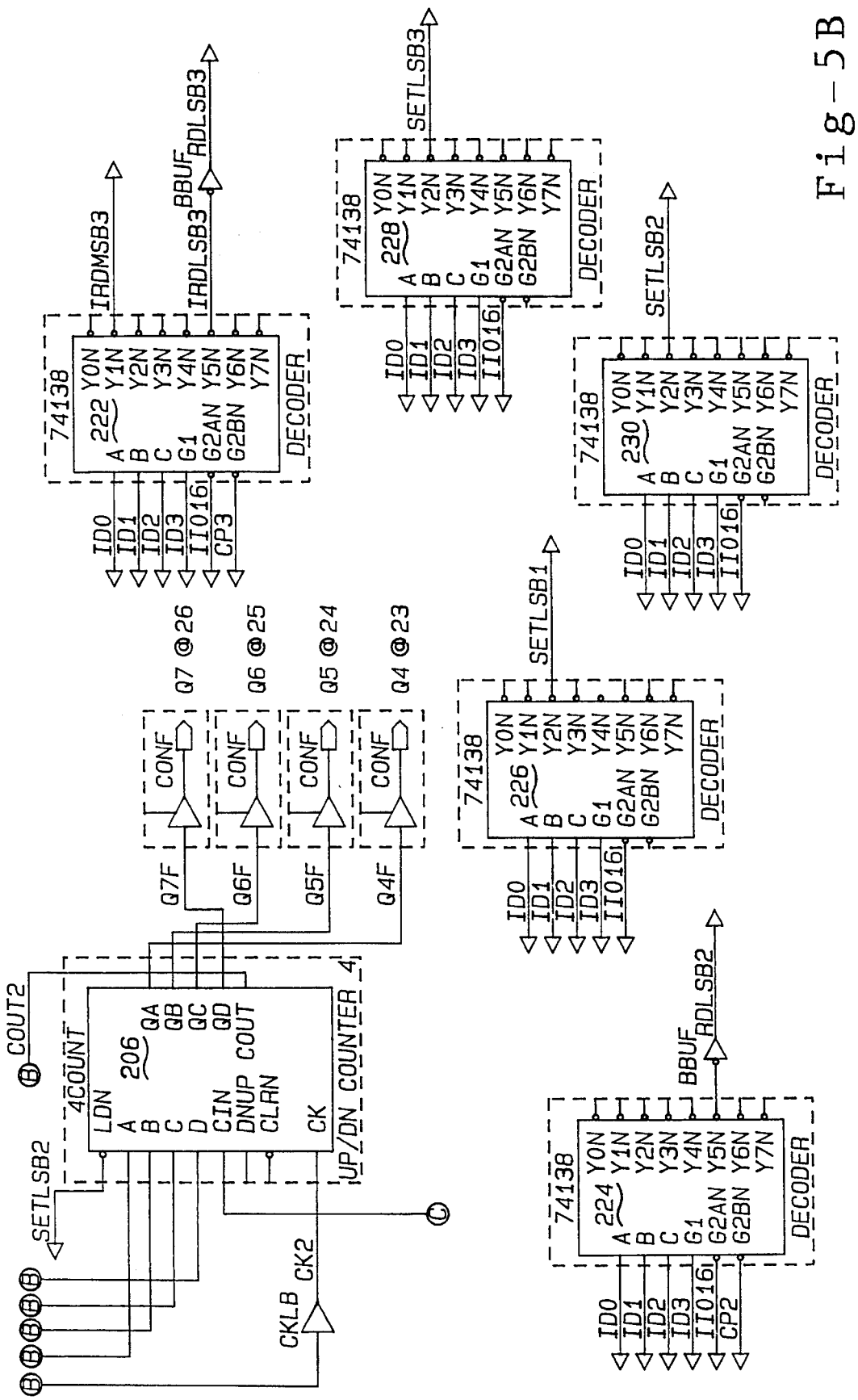

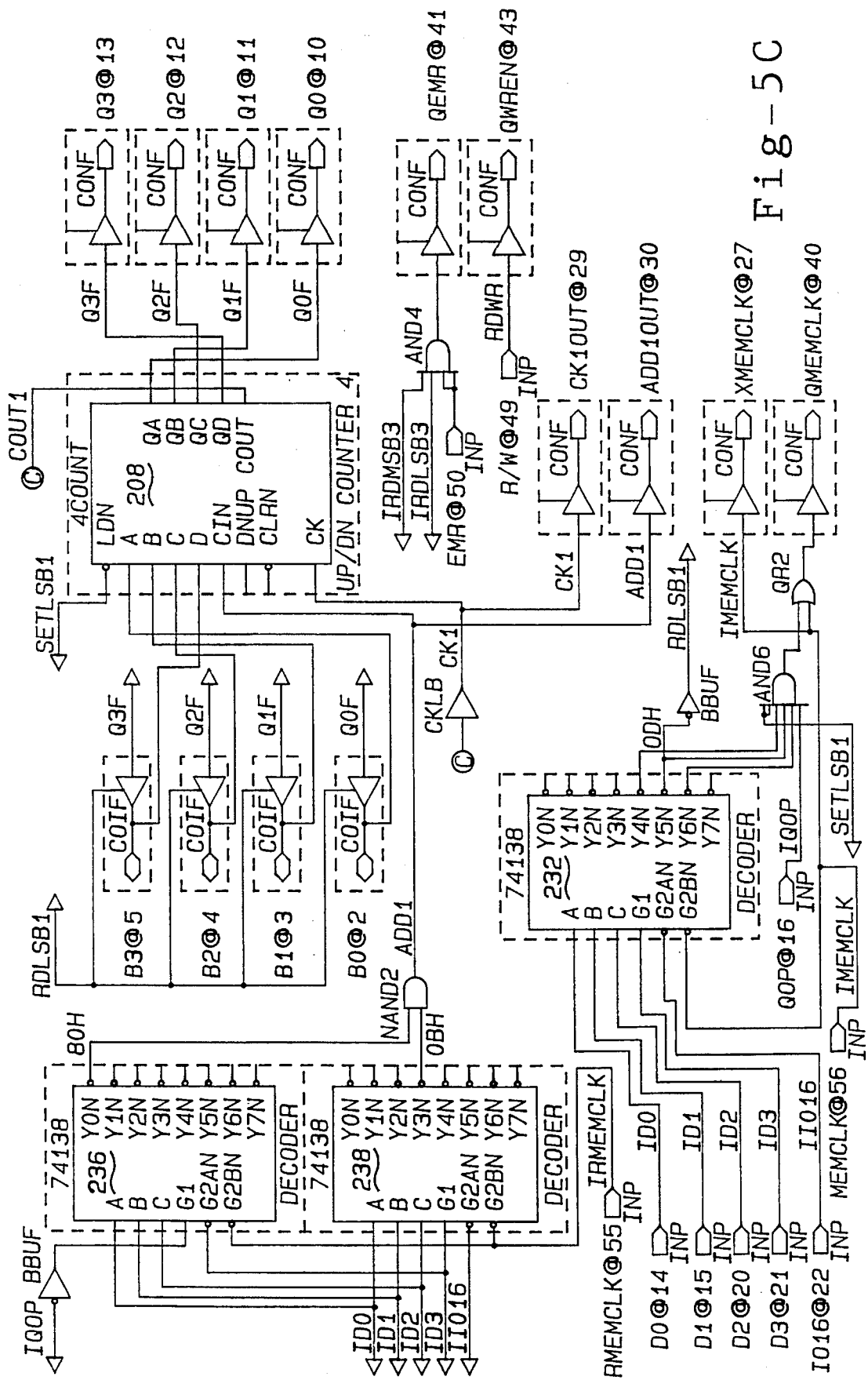

| Q Memory Address | Q Memory Contents | Comment |
| --- | --- | --- |
| A000 | 3284 | Beginning Address of "ADD" Subroutine |
| A001 | 8291 | Address of Argument AC(1) |
| A002 | 8293 | Address of Argument AC(2) |
| A003 | 3150 | Beginning Address of "Store" Subroutine |

| P Memory Address | P Memory Contents | Comment |
| --- | --- | --- |
| 3284 | 2680 | Get 1st Argument Address from Q Memory (LMNY) |
| 3285 | 3800 | Get 1st Argument Value from D Memory (LDAI) |
| 3286 | 2680 | Get 2nd Argument Address from Q Memory (LMNY) |
| 3287 | 3400 | Add 2nd Argument Value from D Memory (ADDI) |
| 3288 | 8C80 | Go to Next Subrout. in Q Mem., Returning Result (JMPY) |

| D Memory Address | D Memory Contents | Comment |
| --- | --- | --- |
| 8291 | 0064 | AC(1) -1 to +1 |
| 8292 | 29F5 | AC(1) Scale Factor |
| 8293 | 00C8 | AC(2) -1 to +1 |

Fig. 8

| P Memory Address | P Memory Contents | Comment |
|---|---|---|
| AA11 | E517 | Save Loop Counter (STX) |
| AA12 | 25F4 | Set Analog Input Hardware Read Channel (OTA:F4) |
| AA13 | 25E2 | Start Analog/Digital Conversion (OTA:E2) |
| AA14 | 25E0 | Read Digital Value of Analog Input (INA) |
| AA15 | 3344 | Store AI Value In C Memory And Point To Next One (STAC4) |
| AA16 | E417 | Get Loop Counter Back (LDX) |
| AA17 | 7200 | Done Yet? (NOPT) |
| AA18 | 6C11 | No..Repeat Loop (JMPC) |

| C Memory Address | C Memory Contents | Comment |
|---|---|---|
| 5291 | 4000 | AI(1) -1 to +1 |
| 5292 | 0360 | AI(1) Voltage |
| 5293 | 4000 | AI(1) Field |
| 5294 | 7FFA | AI(1) Scale Factor |
| 5295 | 6000 | AI(2) -1 to +1 |

Fig. 9

EXTENDED HARVARD ARCHITECTURE COMPUTER MEMORY SYSTEM WITH PROGRAMMABLE VARIABLE ADDRESS INCREMENT

BACKGROUND OF THE INVENTION

The present invention generally relates to computer architectures, and particularly to an extended memory system for a computer based upon the Harvard architecture.

A computer which includes the following two characteristics is generally referred to as having a "Harvard" architecture. Namely, the computer will be designed with separate instruction and data stores, and independent buses will be provided to enable the central processing unit ("CPU") of the computer to communicate separately with each of these stores. This is in contrast to a "yon Neumann" or "Princeton" based computer architecture, which generally employs the same physical store for both instructions and data, and a single bus structure for communication with the CPU. Various approaches have been taken to designing a microcomputer or microprocessor with a Harvard architecture, as represented by the following patents: Yasui et al. U.S. Pat. No. 5,034,887, issued on Jul. 23, 1991, entitled "Microprocessor With Harvard Architecture"; Portanova et al. U.S. Pat. No. 4,992,934, issued on Feb. 12, 1991, entitled "Reduced Instruction Set Computing Apparatus And Methods"; Mehrgardt et al. U.S. Pat. No. 4,964,046, issued on Oct. 16, 1990, entitled "Harvard Architecture Microprocessor With Arithmetic Operations And Control Tasks For Data Transfer Handled Simultaneously"; and Simpon U.S. Pat. No. 4,494,187, issued on Jan. 15, 1985, entitled "Microcomputer With High Speed Program Memory". Additionally, it should be noted that the Intel i860 64-bit microcomputer has been described as having an on-board Harvard architecture, due to the provision of separate instruction and data cache paths. In this regard, a description of the Intel i860 chip design may be found in *i60 Microprocessor Architecture,* by Neal Margulis, Osborne McGraw-Hill, 1990.

The use of separate instruction and data communication paths in a Harvard architecture machine effectively increases the overall speed of the computer by enabling an instruction to be accessed at the same time that data for this or another instruction is accessed. In the context of programmed operations, the instruction is usually referred to as the "opcode" (the operation code), and the data is referred to as the "operand". While the benefit in speed of using the Harvard architecture is significant, the full potential of a machine based upon the Harvard architecture, has yet to be realized. More specifically, it is believed that substantial advantages may be achieved by addressing the nature, roles and potential cooperation between separate memory stores in a machine which is based upon the Harvard architecture.

Accordingly, it is a principal objective of the present invention to provide a unique memory system which significantly extends the capability of the Harvard architecture.

It is another objective of the present invention to provide an extended memory system which reduces the amount of memory space required to store a computer program.

It is a further objective of the present invention to provide an extended memory system which enables at least two different memory accessing procedures to be utilized.

It is an additional objective of the present invention to provide an extended memory system which reduces the time required for often repeated memory operations.

It is also an objective of the present invention to provide an extended memory system which more effectively utilizes a desired data structure.

It is yet another objective of the present invention to provide an extended memory system which is particularly advantageous in a process control computer.

SUMMARY OF THE INVENTION

To achieve the foregoing objectives, the present invention provides an extended memory system which includes an address store for containing an ordered sequence of program memory addresses, and a value store for containing a series of related data value sets. Both the address store and the value store are preferably connected to the same data communication path which is used by a separate data memory of the computer.

The address store determines the sequence of operations to be implemented through its stack of program memory addresses. In this regard, each of these program memory addresses identify the location of the first instruction of a particular subroutine which is contained in the program memory. The address store may also contain the address of one or more subroutine arguments which is, in turn, contained in either the value store or in the data memory. Thus, the address store may be utilized as a location server for both the program memory and the data memory of a computer which is based upon the Harvard architecture.

The value store also includes a logic interface for enabling a plurality of different address increments to be programmably selected. This variable incrementing capability is particularly advantageous in a process control environment where a relatively large number of input values need to be rapidly read, transformed and evaluated. For example, it may be useful for a process control computer to generate an expanded set of data values for each input signal that has been received from a particular process sensor. Assuming that a predetermined data structure is used for these data value sets, then the number of steps required to record or retrieve this data may be substantially reduced by changing the address increment used with the value store.

Additional features and advantages of the present invention will become more fully apparent from a reading of the detailed description of the preferred embodiment and the accompanying drawings in which:

BRIEF DESCRIPTION OF THE DRAWINGS

FIGS. 3, 3A, 3B, 3C, 3D and 3E represent a schematic diagram of the Q memory circuit.

FIGS. 5, 5A, 5B, 5C and 5D represent a schematic diagram of the Q register programmable logic device shown in FIG. 3.

FIG. 8 is a diagrammatic illustration of the operation of the Q and D memory circuits.

FIG. 9 is a diagrammatic illustration of the operation of the P and C memory circuits.

DETAILED DESCRIPTION OF THE PREFERRED EMBODIMENTS

Figure 1:
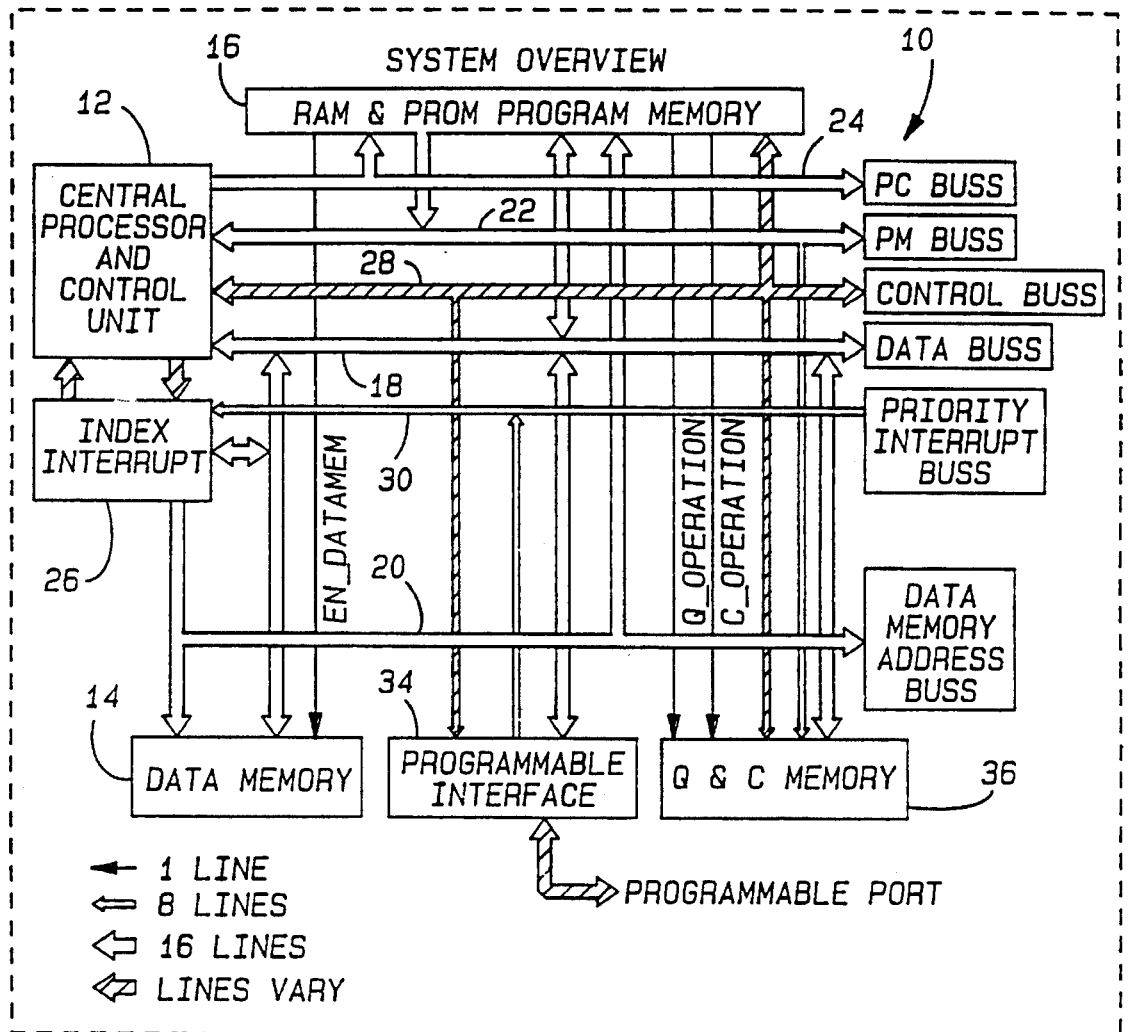
FIG. 1 is a block diagram of a computer which features an extended memory system in accordance with the present invention.

Referring to FIG. 1, a block diagram of a computer 10 is shown. The computer 10 includes a Central Processor and Control Unit ("CPU") 12. In accordance with one embodiment herein, the CPU 12 is based upon the MIPROC processor from Radstone Technology plc. However, it should be appreciated that other CPU circuits or microprocessors may be used, and that the principles of the present invention are not limited to any particular CPU construction or integration. It should also be appreciated that all of the circuits in the computer 10 may be integrated into a single microcomputer chip in the appropriate application.

In accordance with a strict Harvard architecture configuration, the computer 10 includes a data memory 14, a program memory 16, and a separate bus structure for each of these memories. In this regard, the 64 k data memory 14 is provided with a data bus 18 (the "B" bus), and a data memory address bus 20. Similarly, the 64 k program memory 16 is provided with a program memory data bus 22 ("PM Buss"), and a program memory address bus 24 ("PC Buss"). The computer 10 also includes an Index Interrupt circuit 26, which enables the CPU 12 to access data on the data bus 18. More specifically, the Index Interrupt circuit 26 provides a 16-bit address which is derived from one of eight address modes. The addressing mode is selected by the instruction which is to be executed.

While the computer 10 employs a 16-bit bus structure, it should be understood that other suitable bus widths may be employed in the appropriate application. Similarly, the storage capacity of the data memory 14 and the program memory 16 may be altered as well. However, one of the advantages of the invention's extended memory system is that the size of the program memory 16 may be considerably smaller than would otherwise be required with a conventional Harvard architecture. Additionally, the program memory 16 may utilize random access memory ("RAM"), electrically programmable read only memory ("EPROM"), or a combination of both to store program instructions, as will be described below, and the operating system. For example, the EPROM may be used to store the operating system and those subrountines that are unlikely to be changed, while the RAM may be used to store those subroutines that are may be more susceptible to updating. The program memory 16 may also employ other suitable memory circuits in the appropriate application, such as EEPROM and Flash memory.

As shown in FIG. 1, the computer 10 also includes a control bus 28, a priority interrupt bus 30, and a Programmable Interface 34. The Programmable Interface 34 provides a programmable port for input and output operations. In other words, the Programmable Interface 34 may be configured to receive input signals which are representative of analog and digital values from various sensors, and configured to transmit output signals for one or more control devices. Additionally, the Programmable Interface may be used to receive and transmit communication signals as well.

In accordance with the present invention, the computer 10 includes an extended memory system 36, which is generally represented by the block labeled "Q & C Memory" in FIG. 1. As will be seen in connection with FIG. 2, the extended memory system 36 includes two separate memories, which are referred to herein as the Q memory and the C memory. However, it should be noted from FIG. 1 that both of these memories are connected to the data bus 18. The Q and C memories also receive control signals which are decoded in the program memory 16, such as Q_operation and C_operation.

Figure 2:
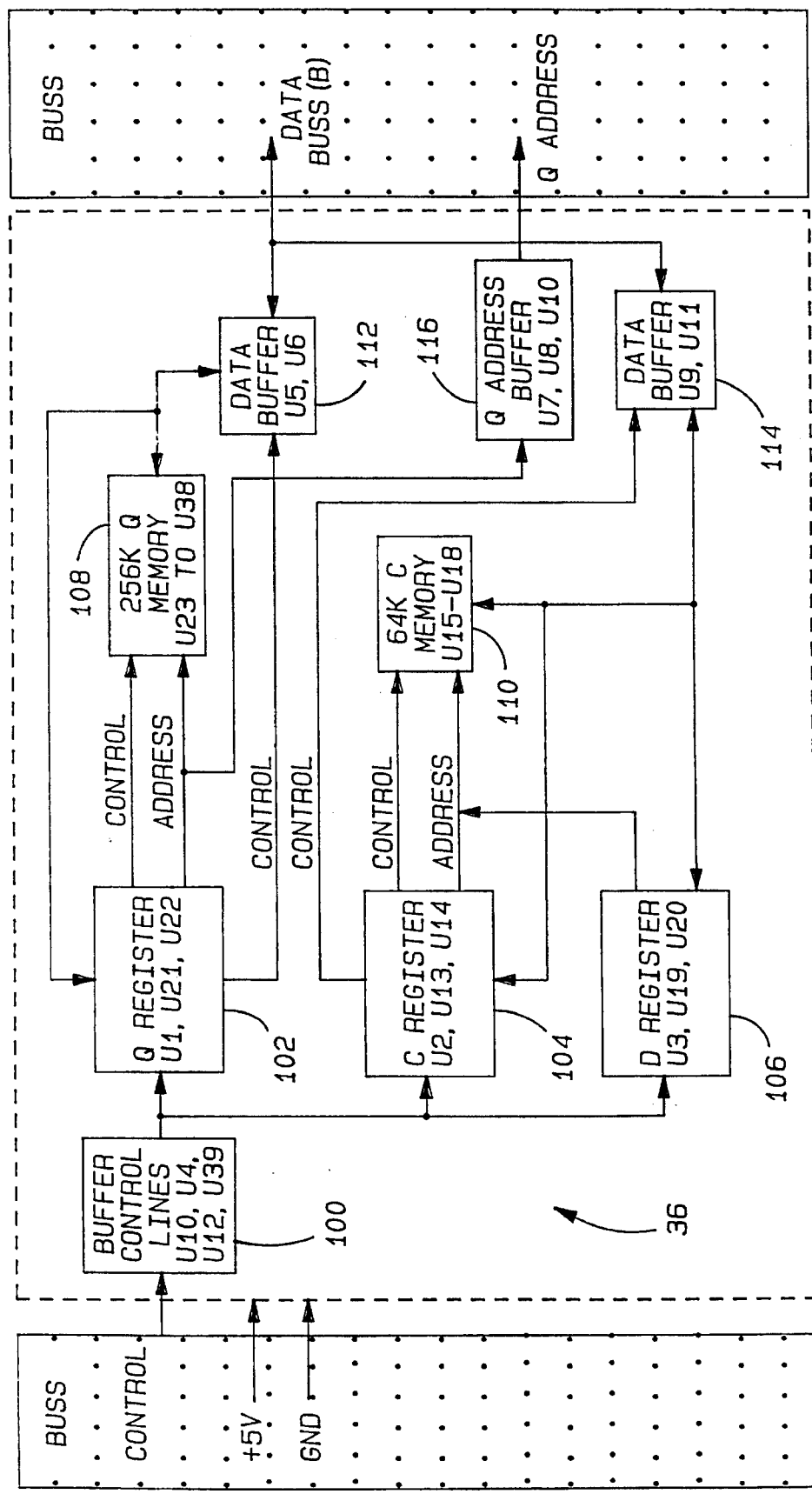
FIG. 2 is a block diagram of the Q and C memory circuits of the extended memory system shown in FIG. 1.

Referring to FIG. 2, a block diagram of the extended memory system 36 is shown. The extended memory system includes a set of buffers 100, which are used to receive various control and addressing signals. These control and addressing signals are selectively transmitted to three distinct registers, namely Q register 102, C register 104 and D register 106. Thus, for example, the Q register 102 will receive the Q_operation signal, while the C register 104 will receive the C_operation signal. However, all three of these registers will receive certain signals in common, such as the memory clock signal ("MEMCLKB"), and certain address signals from the program memory data bus 22.

The Q register 102 controls the operation of a 256 K Q memory circuit 108. The Q memory circuit is provided to store an ordered sequence of memory addresses which ultimately defines the particular program to be implemented by the computer 10. In sharp contrast to typical programs that have been compiled and linked, the application program for the computer 10 is uniquely divided between the program memory 16 and the Q memory circuit 108. In this regard, the program memory 16 is used to store the instructions, or opcodes, for a common set of subroutines that may be used in a variety of application programs. Thus, for example, the program memory 16 may contain a number of different arithmetic and logical subroutines, such as for adding two numbers together, and IF . . . THEN expressions.

In comparison, the Q memory circuit 108 is designed to store address information which is associated with these subroutines. More specifically, the Q memory circuit 108 is adapted to store the addresses of these subroutines, such as the address of the first instruction of a subroutine, in an ordered sequence to define the computer program. Preferably, the Q memory circuit 108 also stores the addresses of any arguments that may be required by these subroutines. These arguments, or operands, may be found in the data memory 14 or in the C memory circuit 110 to be described below. With this division of responsibility for storing the application program, it should be understood that the routines used by the program need only be stored once, even though they may be used repeatedly throughout the program. Thus, only a minimal amount of storage capacity is required for the application program in the computer 10. The use of Q memory also has other advantages as well. For example, execution speed may be enhanced, because normal subroutine overhead is avoided, such as pushing one or more addresses on a stack. Additionally, subroutine arguments may be readily changed by a programmer without having to recompile the program. Rather, the argument value may be changed directly in the memory location referenced in Q memory.

The C memory circuit 110 is controlled a logic means, which includes by the C register 104 and, alternatively, the D register 106. The C memory circuit 110 is adapted to store data values, and in this respect, the C memory circuit 110 may be used to extend the storage capacity that would otherwise be provided by the data memory 14. However, in accordance with the present invention, the C register 104 is designed to enable the C memory circuit 110 to be accessed in increments that may be varied automatically by program instructions. As will be described below, the C memory circuit 110 may be accessed in address increments of one, two or four, depending upon the instruction employed. In other words, an explicit instruction may be given to advance a counter in the C register 104 which determines the currently accessible address of the C memory circuit 110.

The D register 106 is used in order to access two different data tables in the C memory circuit 110 without having to transfer address pointers into and out of memory. In other words, the counter contained in the C register 104 may be pointing to the address of one data table in the C memory circuit 110 (where an address increment greater than one would be useful), while the counter contained in the D register 106 is pointing to the address of another data table in the C memory circuit (where an address increment of one is appropriate).

It should also be noted from FIG. 2 that both the Q memory circuit 108 and the C memory circuit 110 are connected to the data bus 18. The Q memory circuit 108 is connected to the data bus 18 through data buffers 112, while the C memory circuit 110 is connected to the data bus through data buffers 114. Accordingly, it should be appreciated that the writing and reading operations for the Q memory circuit 108 and the C memory circuit 110 are effectively multiplexed through the Q_operation and C_operation control signals. A pair of address buffers 116 is also provided to present the current address of the Q register 102 to a logic analyzer debugging device connector. The current address of the Q register 102 may also be read by the CPU 12 through the data buffers 112. In light of the fact that the ordered sequence of addresses in the Q memory circuit 108 define the steps to be implemented by the computer 10, the current address of the Q memory circuit 108 provides another way to determine the current state of the programmed operations.

Figure 3:
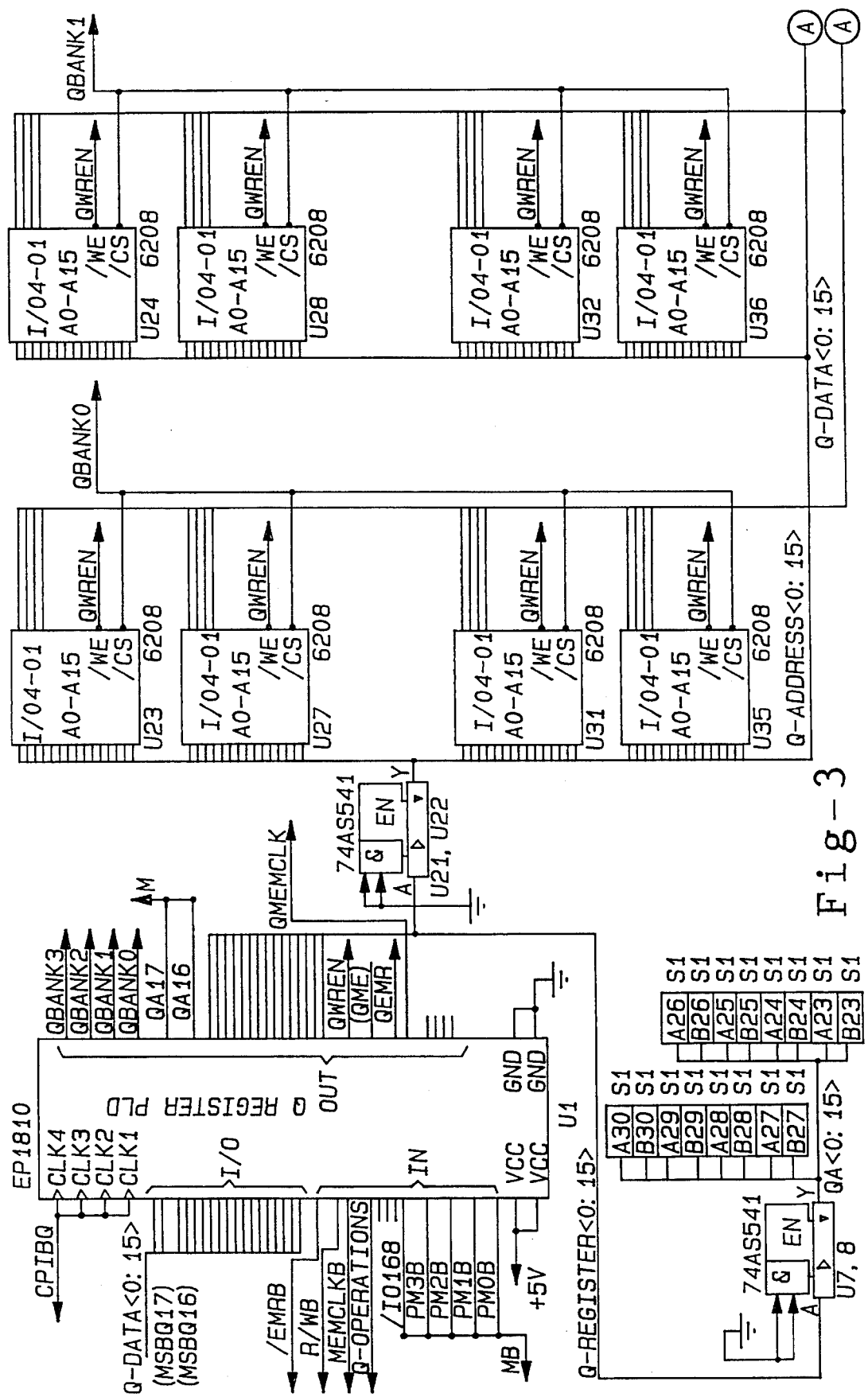
Figure 4:
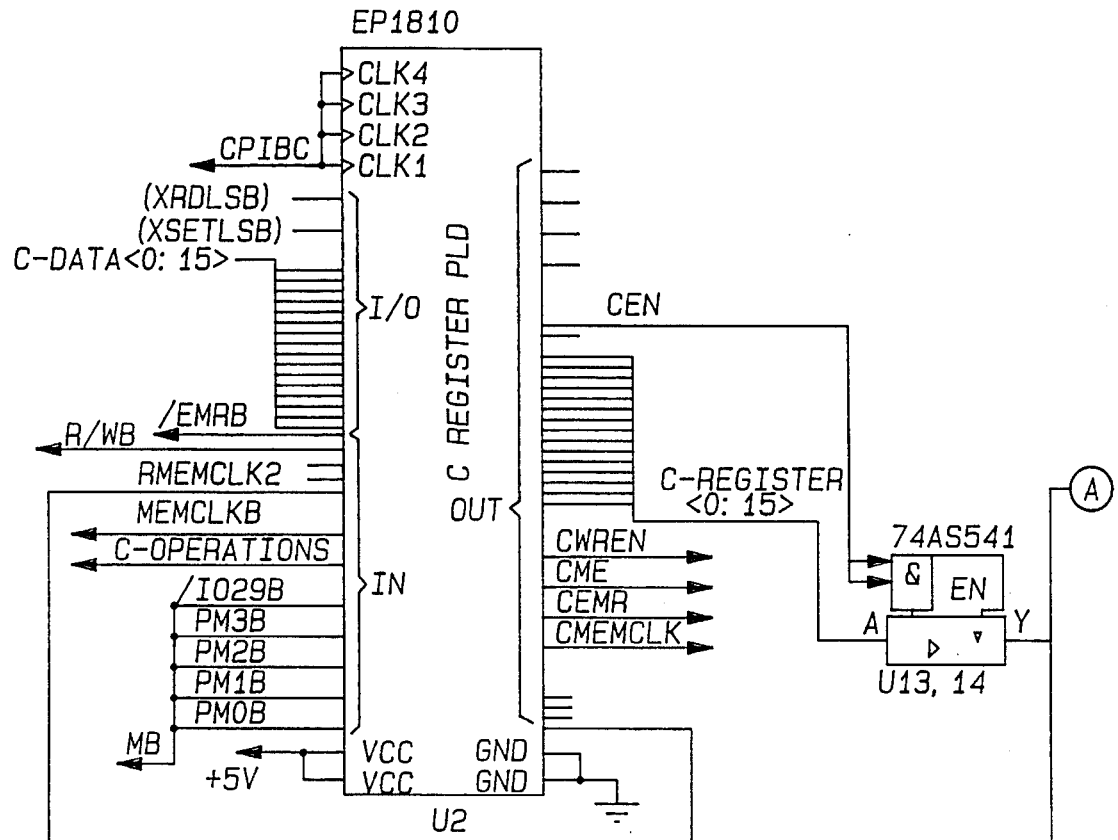
FIGS. 4 and 4A represent a schematic diagram of the C memory circuit.
Figure 4:
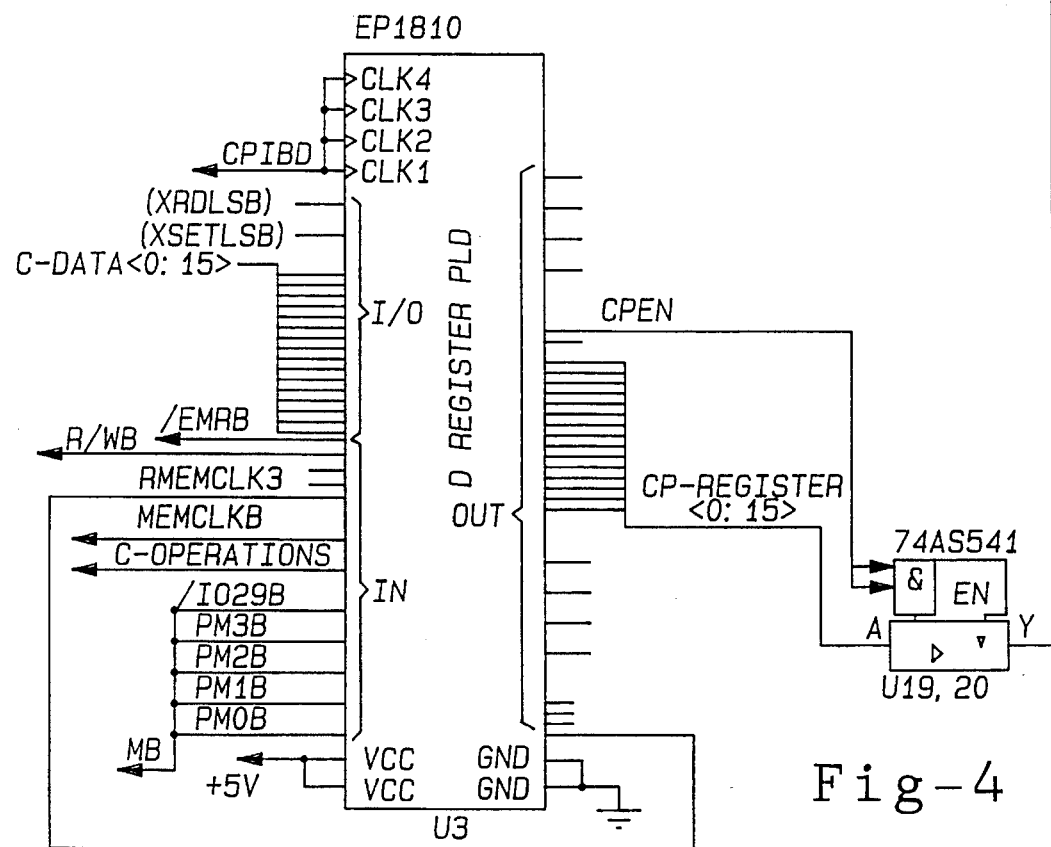
Figure 4A:
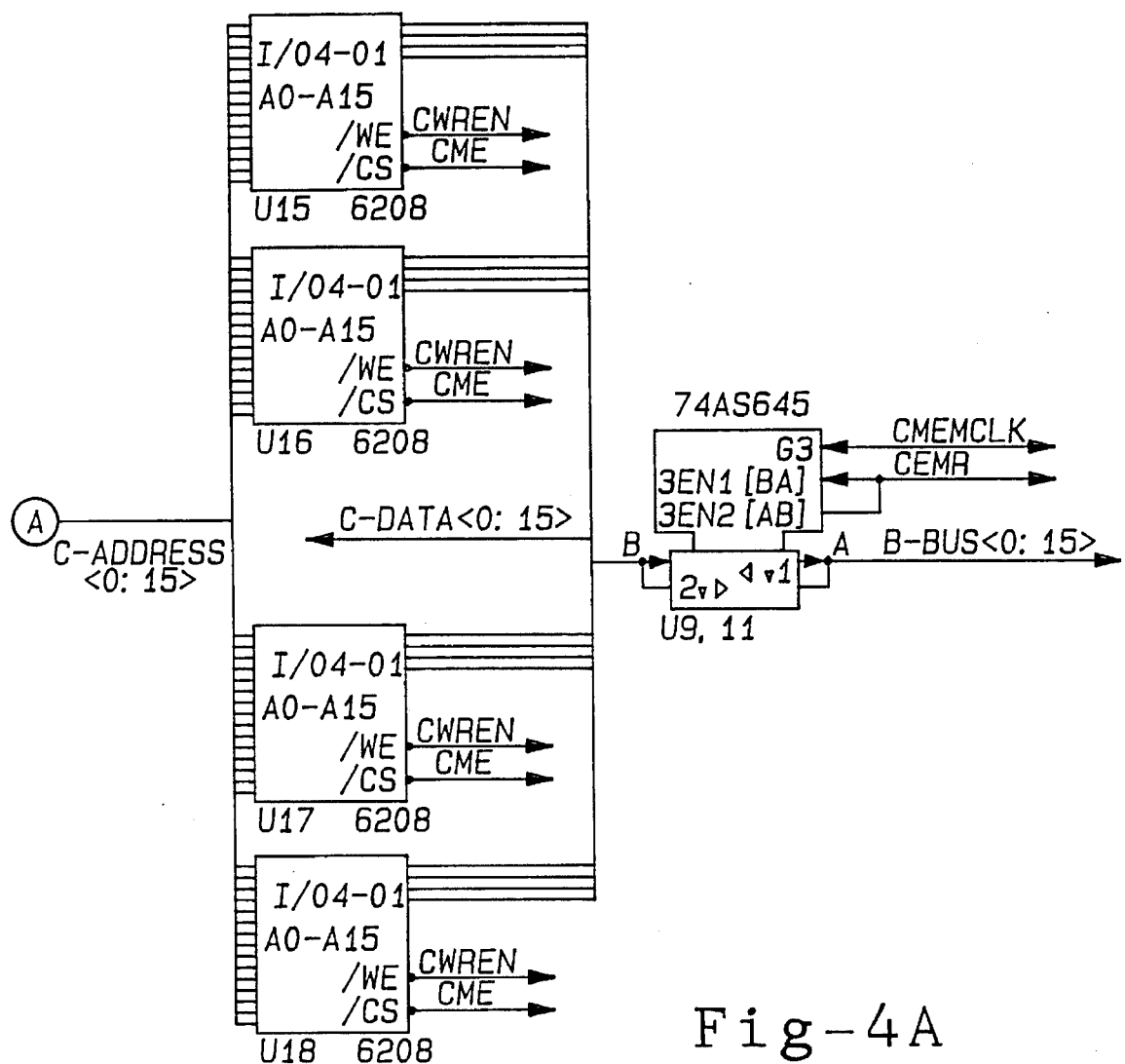

Referring to FIGS. 3–4A, a schematic diagram of the extended memory system 36 is shown. The control line buffers 100 are shown to be comprised of a tri-state octal buffer/line driver circuit U10 (74AS541), and three quad AND gate circuits U4, U12 and U39 (7408). The line driver circuit U10 receives the four least significant bits from the program memory data bus 22 (PM0–PM3), two input/output control signals (IO16, IO29) and the two most significant Q memory address bits (QA16–QA17). The use of these signals will be described below in connection with FIG. 5–5D. The AND gate circuits U4, U12 and U39 operate as buffers, since one input to each of the internal AND gates is tied to a +5 volt reference. The AND gate circuit U4 conditions the memory enable signal "/EMR", the memory read/write signal "R/W" and the memory clock signal "MEMCLK". The letter "B" is added to the label for these signals at the outputs to indicate that they represent buffered versions of the signals received from the control bus 28. Similarly, the AND gate circuit U12 is used to buffer the Q_operation and C_operation signals. The AND gate U39 is used to both buffer and replicate the CPI clock signal from the CPU 12.

Figure 5:
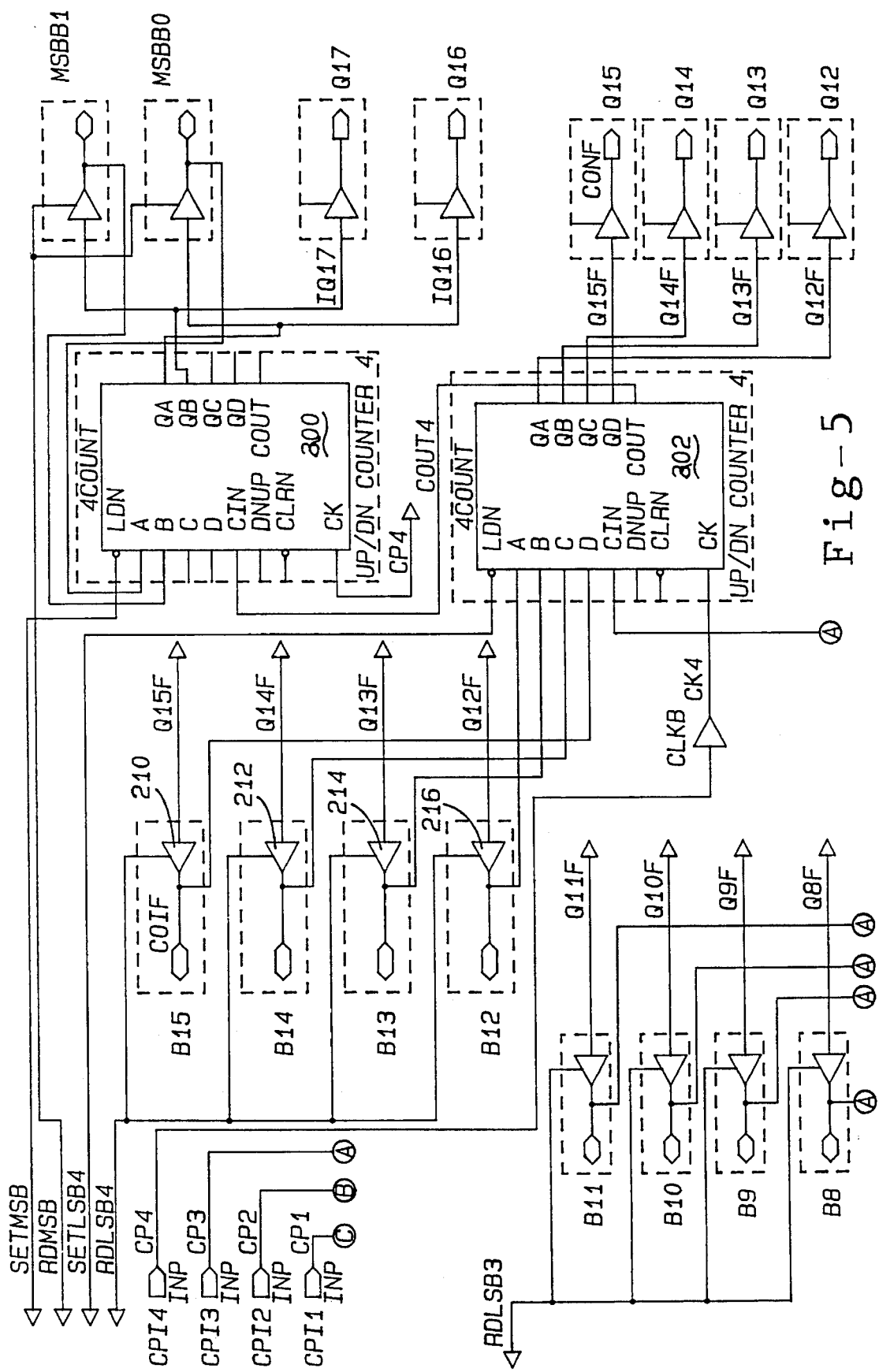
Figure 5A:
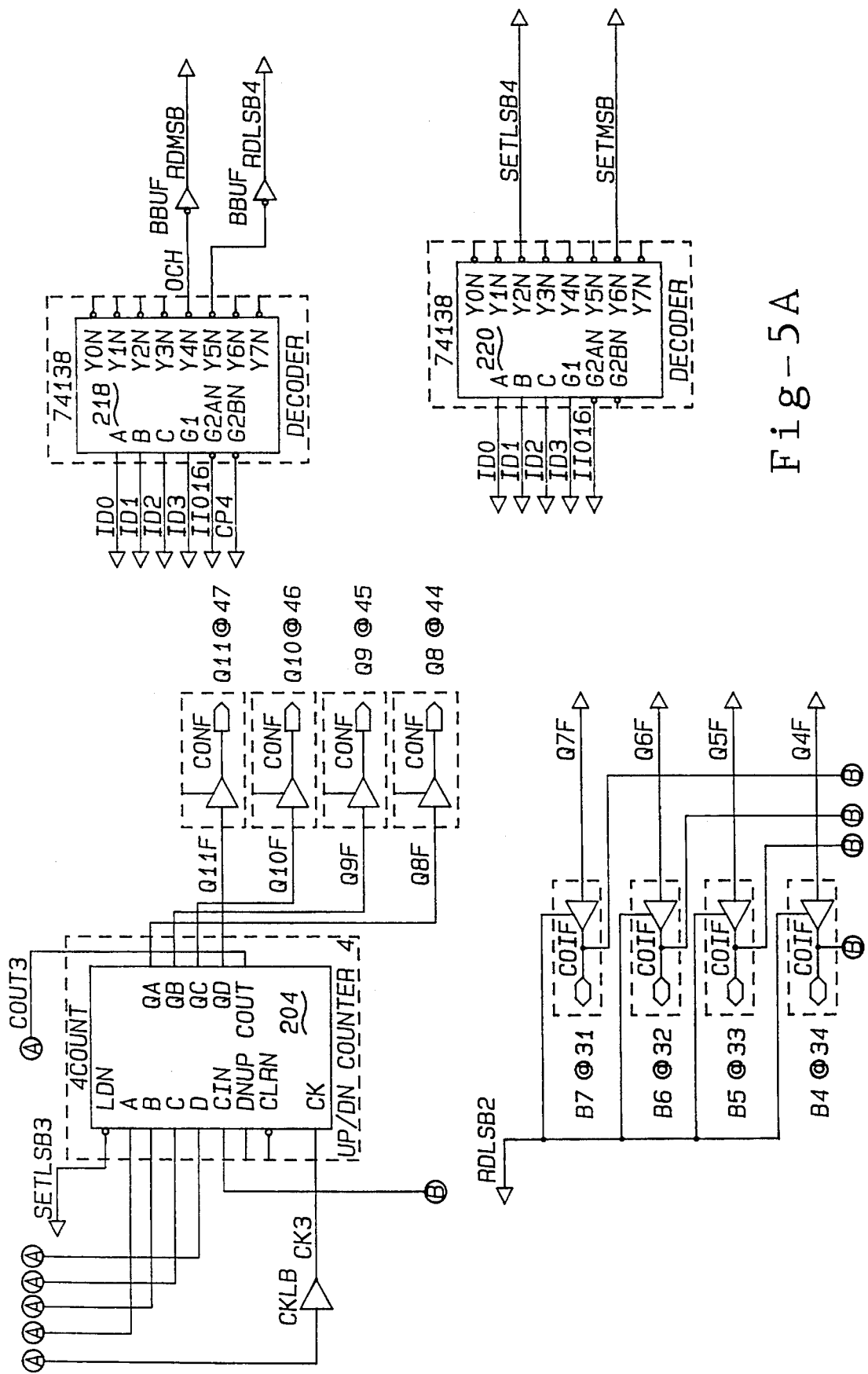
Figure 5D:
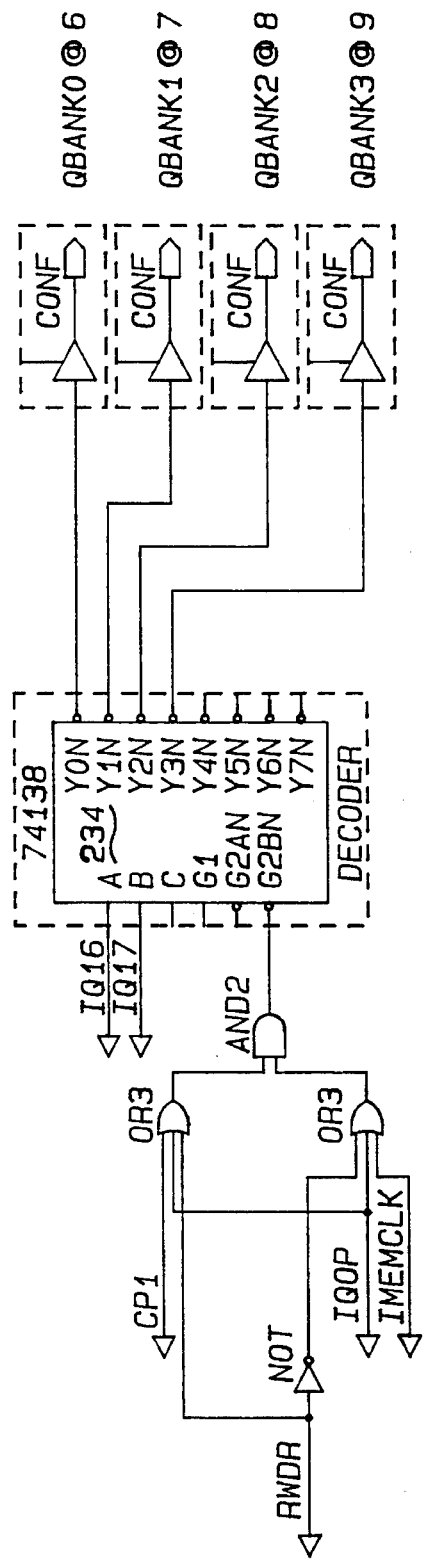

The Q register is shown to be comprised of an 18-bit programmable logic device U1 ("PLD"), and a pair of octal line drivers U21 and U22 (74AS541). In the present embodiment, the PLD is an 2100 gate application specific integrated circuit (EP1810), which has been programmed as shown in FIGS. 5–5D. However, it should be appreciated that other suitable logic circuits may be employed in the appropriate application. The PLD U1 allows the CPU 12 to set or read an internal counter, and to increment this counter by one when so instructed. The PLD U1 outputs sixteen of the eighteen address lines to the Q memory array 108, while internally demultiplexing the remaining two most significant address lines for selecting one of four 64 k RAM banks U23–U38 (6208) in the Q memory array. In this regard, RAM bank 0 is comprised of memory chips U23, U27, U31 and U35. Similarly, RAM bank 1 is comprised of memory chips U24, U28, U32 and U36; RAM bank 2 is comprised of memory chips U25, U29, U33 and U37; and RAM bank 3 is comprised of memory chips U26, U30, U34 and U38.

Figure 3A:
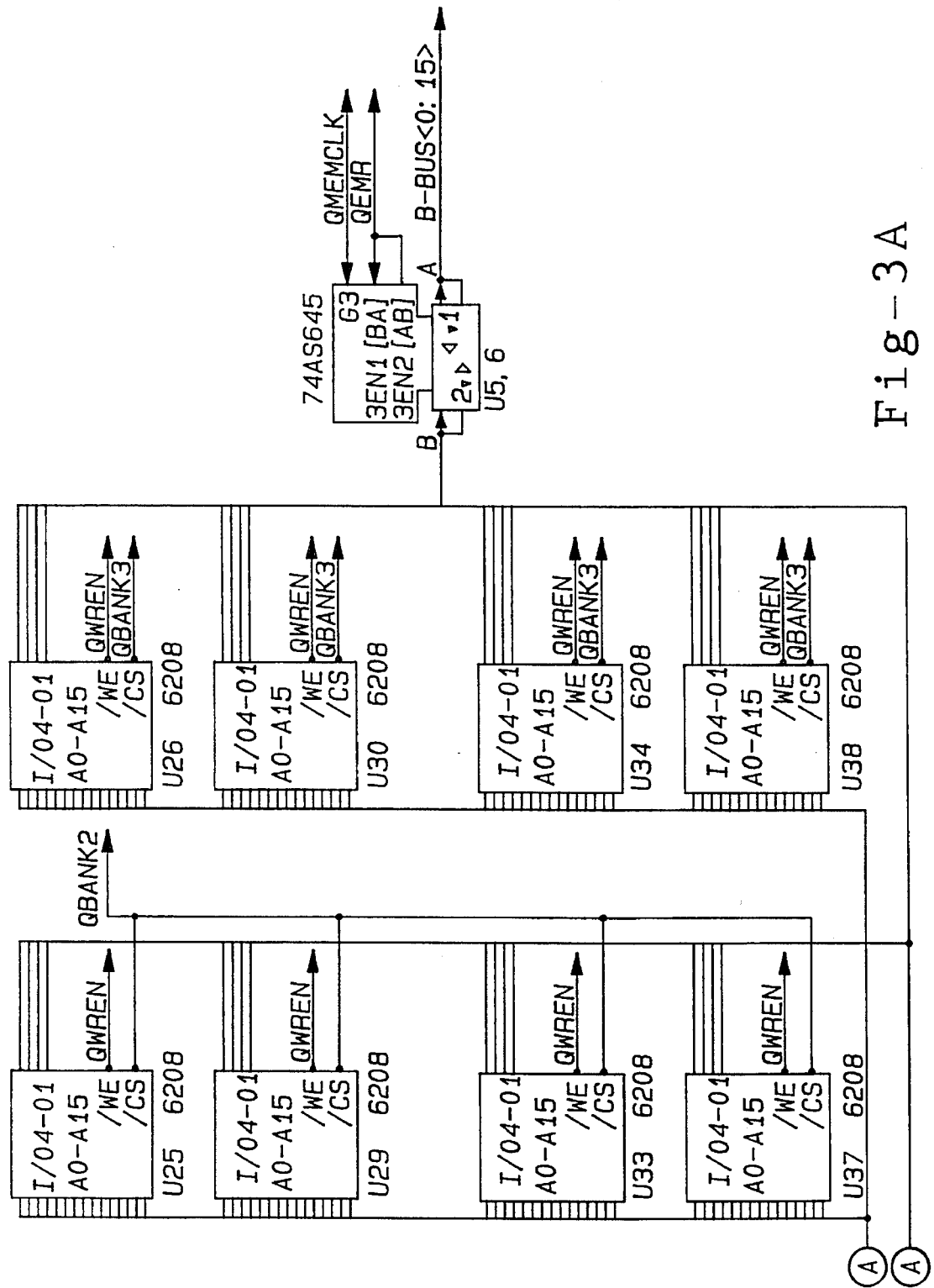

FIG. 3 also shows that the Q address buffers 116 are comprised of a pair of line drivers U7–U8 (74AS541), and two lines from the line driver U10. Additionally, FIG. 3A shows that the data buffers 112 are comprised of a pair of octal bus transceivers U5 and U6 (74AS645).

Turning to FIG. 4–4A, a schematic diagram of the C register 104, the D register 106 and the C memory array 110 is shown. The C register 104 is comprised of an 16-bit PLD U2, and the D register 106 is comprised of an 16-bit PLD U3. This circuit arrangement is similar to that described above in connection with the Q register 102 and the Q memory array 108, except that the programming for the C and D registers is different and the C memory array 110 only has one 64 k memory bank U15–U18 (6208). Both the C register 104 and the D register 106 allow the CPU 12 to set or read their internal 16-bit counters, and increment-by-one when instructed. However, as indicated above, the C register 104 also includes the capability to employ additional memory access procedures with increments by integers greater than one. In one form of the present invention, the C register 104 is programmed to enable increments by two and four. However, it should be appreciated that further or different integer increments may also be provided under the principles of the present invention.

Additionally, it should be noted that the output bus lines from the C register 104 and the D register 106 are buffered (via octal line drivers U13–U14 and U19–U20) and joined in common with the C address bus to the C memory array 110. Similarly, data buffers 114 are shown to be comprised of a pair of octal transceivers U9 and U11. These transceivers are provided to connect the C memory data bus to the "B" data bus 18.

Referring to FIGS. 5–5D, a schematic diagram of the Q register 102 (PLD U1) is shown. While the Q register 102 has been provided with 20-bit addressing capability in this particular embodiment, it is nevertheless treated as a 18-bit address counter when 256 K memory locations are physically contained in the Q memory circuit 108. Accordingly, the Q register 102 includes a set of five 4-bit up/down counters 200–208 which operate to specify the address for the Q memory circuit 108. It should be understood that a greater or lesser number of up/down counters could be utilized, and that the specific circuit embodiments described herein are intended to be exemplary only of the principals of the present invention. However, the Q register 102 is constructed in this embodiment to set, read or increment the up/down counters 200–208 in order to determine the current address of the Q memory circuit 108. Each of the up/down counters 200–208 receives a clock signal, such as CP4 for counter 202. While separate clock signals are generally shown for these counters, this is only because the EP1810 PLD is partitioned into four ports. Accordingly, it should be understood that clock signals CP1, CP2, CP3 and CP4 represent the same clock signal.

As each of the counters 200–208 are similarly arranged, the counter 202 in FIG. 5 will be described as a representative example. The counter 202 includes four data input ports which are connected to the input/output signal lines labeled B12, B13, B14 and B15. The counter 202 may be loaded with the value on these input/output signal lines by the SETLSB4 signal line, which is connected to the Load Enable port of the counter. As indicted by the signal line labeling, each of the data output ports of the counter 202 are connected to their respective input/output signal lines through a set of buffers 210–216. Accordingly, the output signals Q12F, Q13F, Q14F and Q15F may be read from the input/output signal lines by activating the buffers 210–216 through the RDLSB4 signal.

The SETLSB1-4 and RDLSB1-4 signals, as well as the SETMSB and RDMSB signals, are decoded from the signals on selected lines of the program memory data bus 22 and the control bus 28, as indicated in FIG. 3. These program memory data bus lines are labeled ID0–ID3, and one of the control lines is labeled IIO16. As shown in FIGS. 5A–5C, a set of 1-of-8 decoders 218–232 are used to demultiplex each of the "SET . . ." signals for writing a address value into the counters 200–208, and the "RD . . ." signals for reading an address value from these counters. FIG. 5D also shows a decoder 234 which is used for demultiplexing the chip select signals QBANK0-3.

As indicated above, the Q register 102 also includes the capability of incrementing the address of the current address of the Q memory circuit 108. The instruction for this operation is detected through the decoders 236–238 on FIG. 5C. In this regard, it should be noted that the decoder 236 also receives the Q_Operation signal, which is labeled IQOP in FIG. 5C. The decoders 236–238 produce the ADD1 signal which is directed to the carry input port of the counter 208. The ADD1 signal will cause the address generated by the Q register 102 to advance by the integer value of one.

Figure 6:
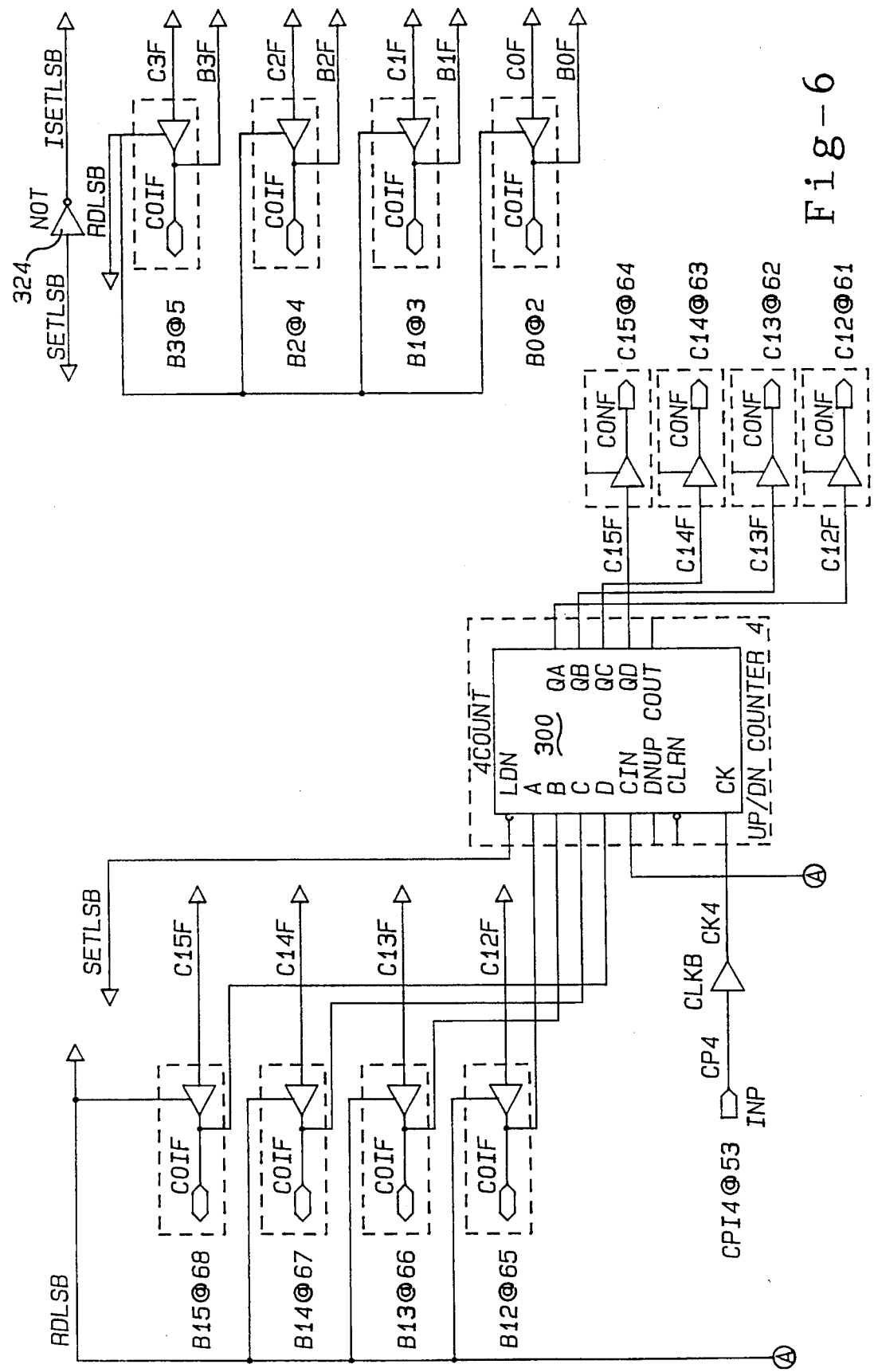
FIGS. 6, 6A, 6B, 6C and 6D represent a schematic diagram of the C register programmable logic device shown in FIG. 4.
Figure 6A:
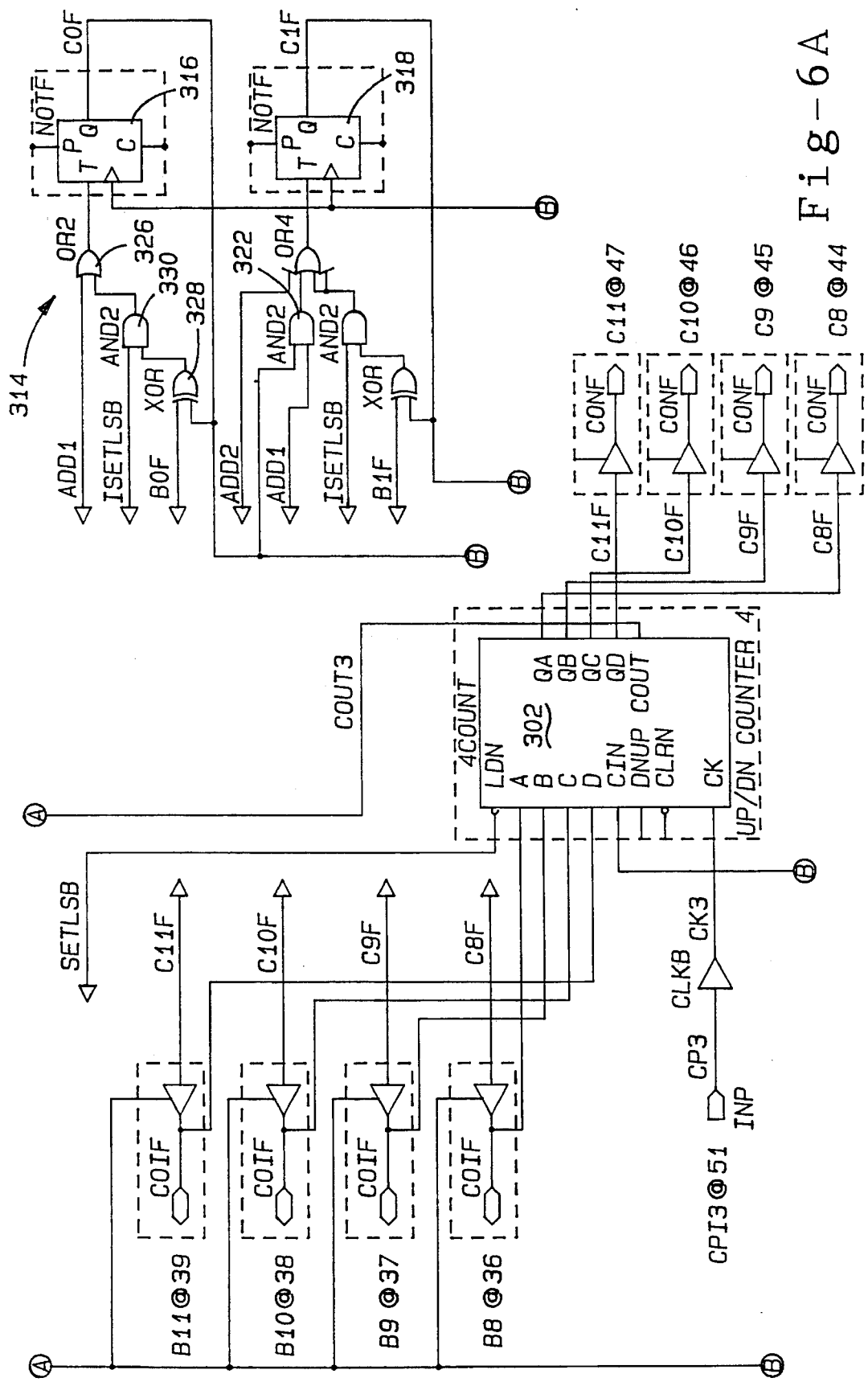
Figure 6B:
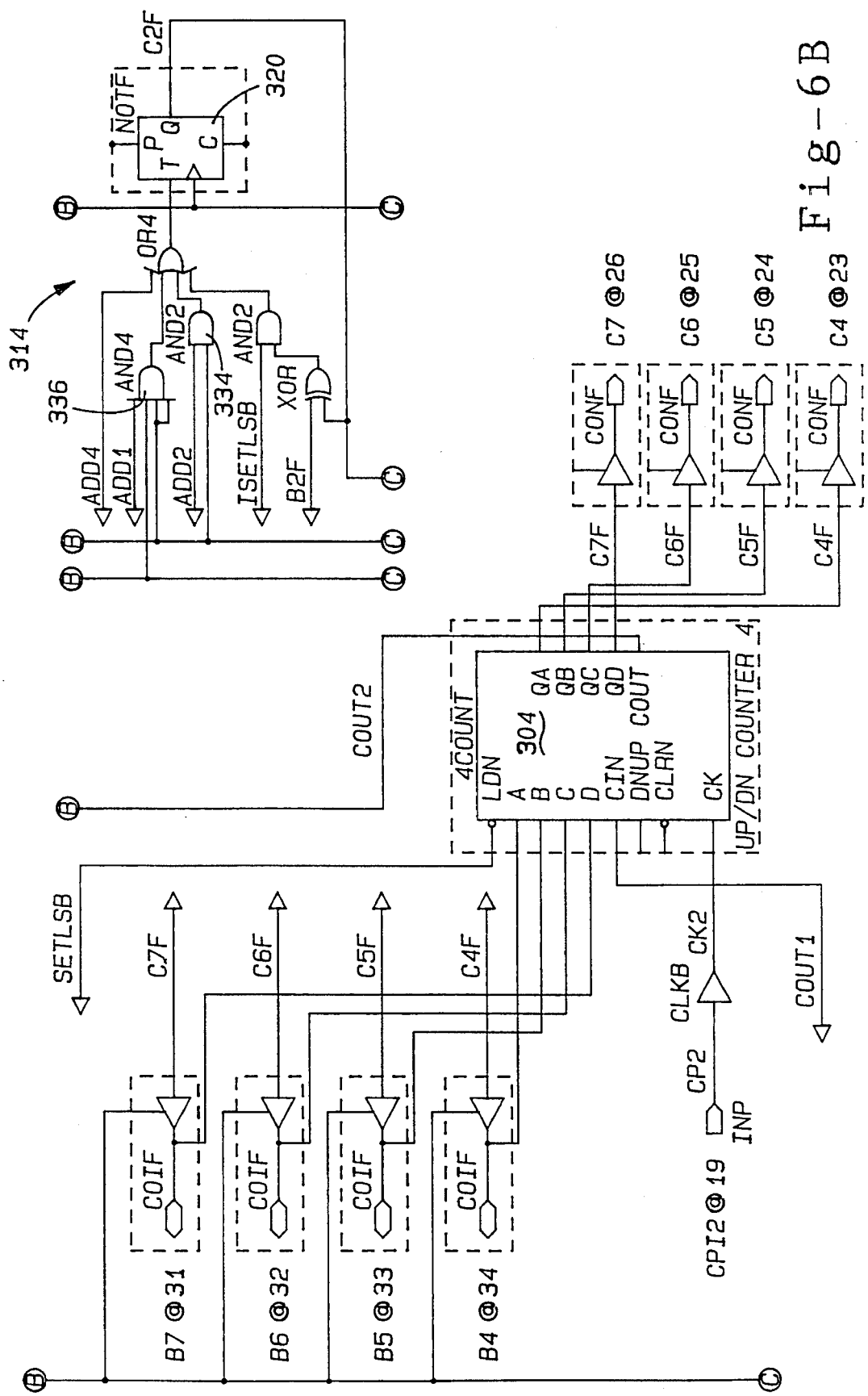
Figure 6C:
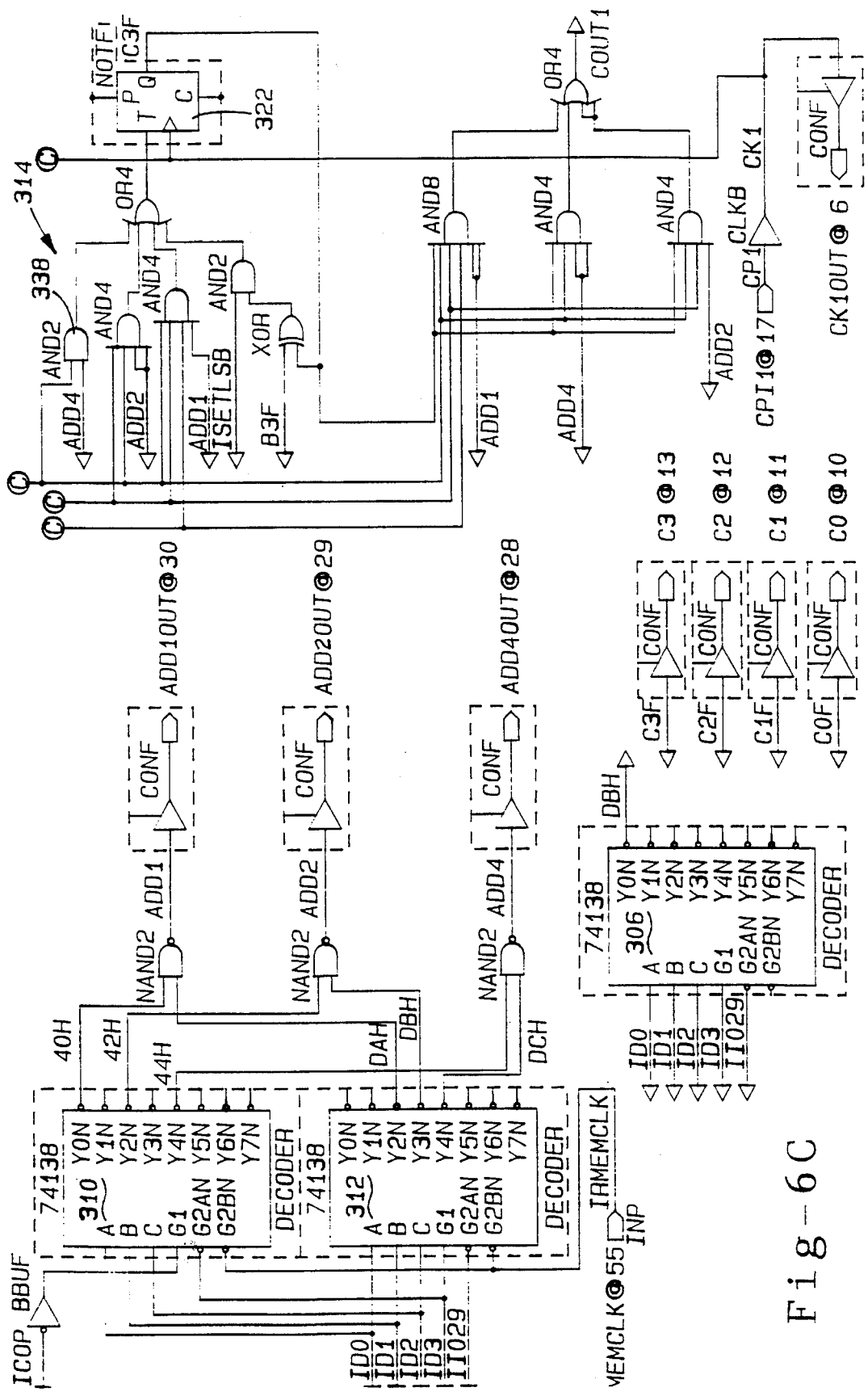
Figure 6D:
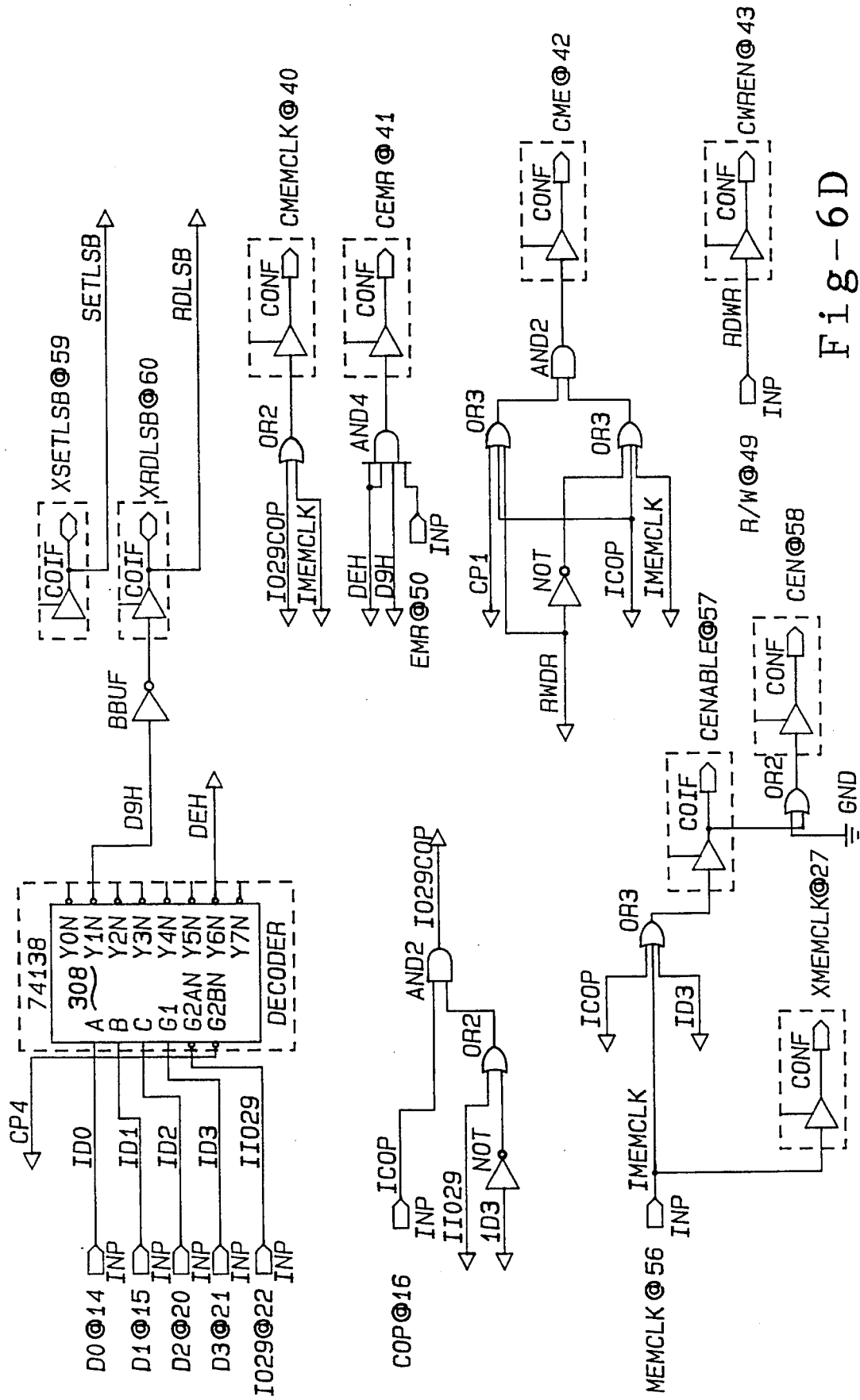

Referring to FIGS. 6–6D, a schematic diagram of the C register 104 (PLD U2) is shown. As in the case of the Q register 102, the C register includes a set of 4-bit up/down counters 300–304 for specifying 12-bits of the address for the C memory circuit 110. Similarly, the C register 104 includes a set of decoders 306–308 for producing the SETLSB and RDLSB signals. However, the C register 104 not only has the ability to control the reading and writing of the C memory circuit 110, but the C register also has the capability to control a plurality of address increments for the C memory circuit. In this regard, a set of decoders 310–312 are provided to demultiplex an ADD1 signal, an ADD2 signal and an ADD4 signal. As the name of these signals imply, the C register 104 is capable of causing the address for the C memory circuit 110 to increment by one, two or four. However, it should also be appreciated that the C register 104 could also be configured to increment the address for the C memory circuit 110 by other integer values as well.

In order to implement the capability for variable address increments in the C memory circuit 110, the C register 104 includes a counter circuit 314 which is shown on FIGS. 6A–6C. This counter circuit 314 effectively takes the place of the fourth 4-bit up/down counter that would otherwise be employed to specify the least significant 4-bits of the address for the C memory circuit 110. The counter circuit 314 includes a set of four flip flops 316–322 which are used to specify the four significant bits of the address for the C memory circuit 110. For example, the flip flop 316 is responsive the ADD1 increment signal and the clock signal CK1. The flip flop 316 is alternatively responsive to a combination of the ISETLSB signal and either the B0F signal or the C0F signal through the OR gate 326. The ISETLSB signal represents the SETLSB signal after it has been processed through inverter 324. Accordingly, as long as the current address value from the C register 1-4 is being read by the CPU 12, then the output from the flip flop 316 is presented again at its input port through the XOR gate 328 and the AND gate 330. The output signal from the flip flop 316 is also connected the next flip flop 318 through the AND gate 332 in order to pass the previous least significant bit up the chain when the ADD1 signal is received. In a similar way, the flip flop 318 receives the ADD2 signal when an increment by the integer value of two is required. Likewise, the third flip flop 320 receives the outputs from both the first flip flop 316 and the second flip flop 318, and processes all three increment signals ADD1, ADD2 and ADD4. While the third flip flop 320 will pass a "HIGH" ADD4 signal through to its output C2F upon the appropriate clock signal transition, the ADD2 signal needs to be combined with the output from the second flip flop 318 (via AND gate 334), and the ADD1 signal needs to be combined with output signals from both the first and second flip flops 316–318 (via AND gate 336). Similar logic processing is also provided for the fourth flip flop 322. For example, in order to cause an increment in the address of the C memory circuit 110 by four when the output signal C3F was "LOW", then the ADD4 signal needs to be combined with a "HIGH" output signal C3F from the third flip flop 320 (via AND gate 338).

Figure 7:
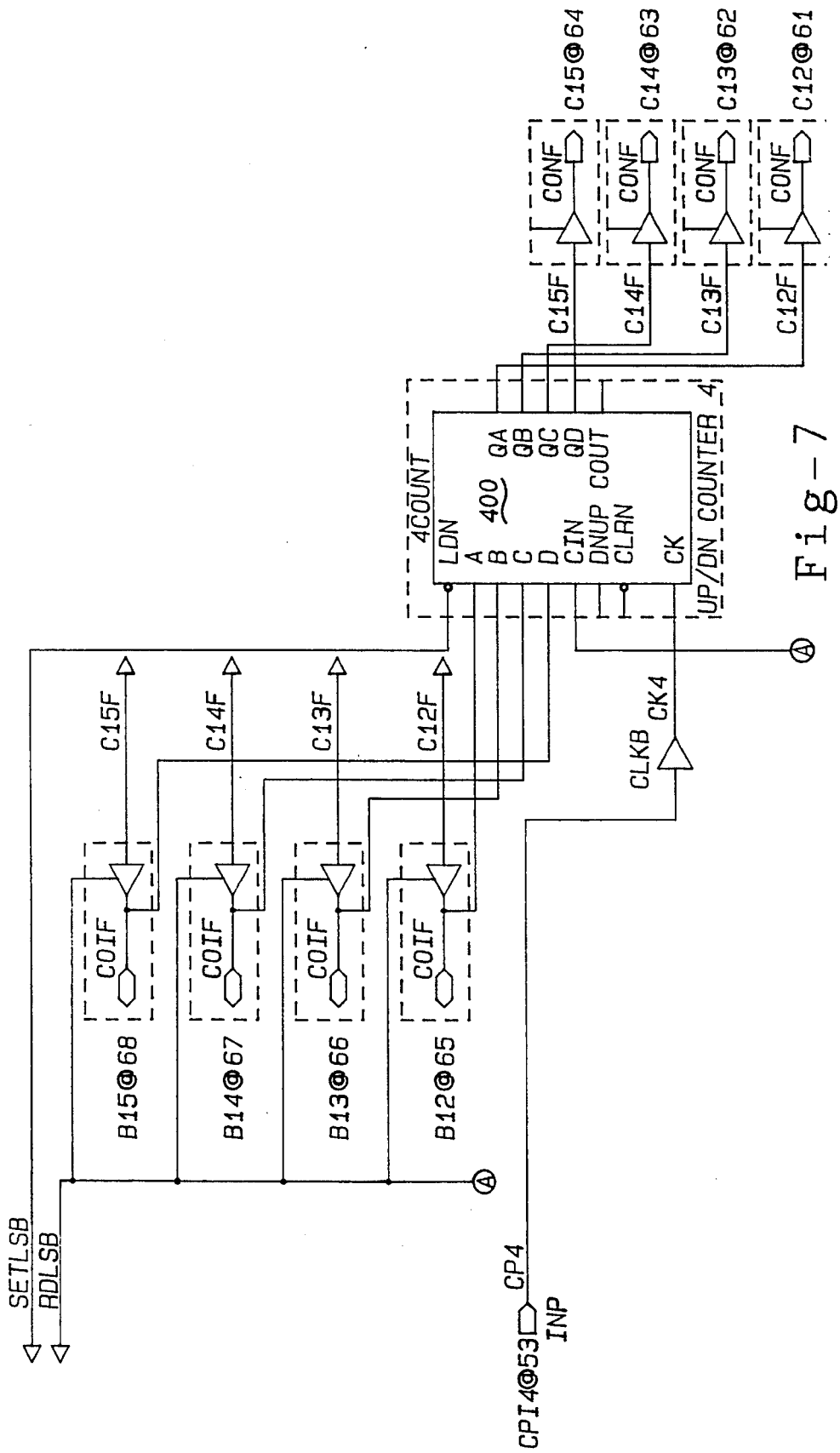
FIGS. 7, 7A, 7B, 7C and 7E represent a schematic diagram of the D register propgrammable logic device shown in FIG. 4.
Figure 7A:
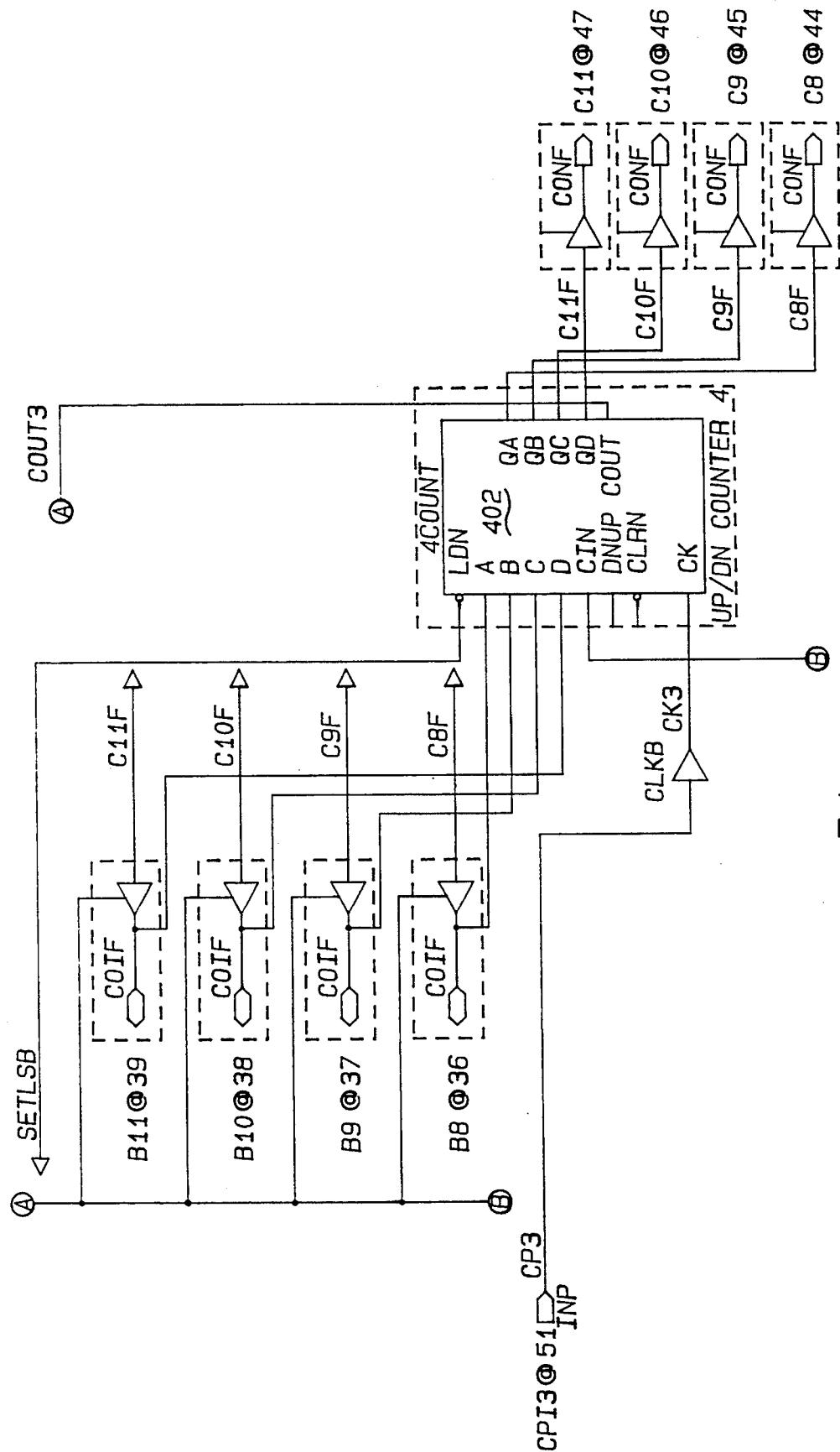
Figure 7B:
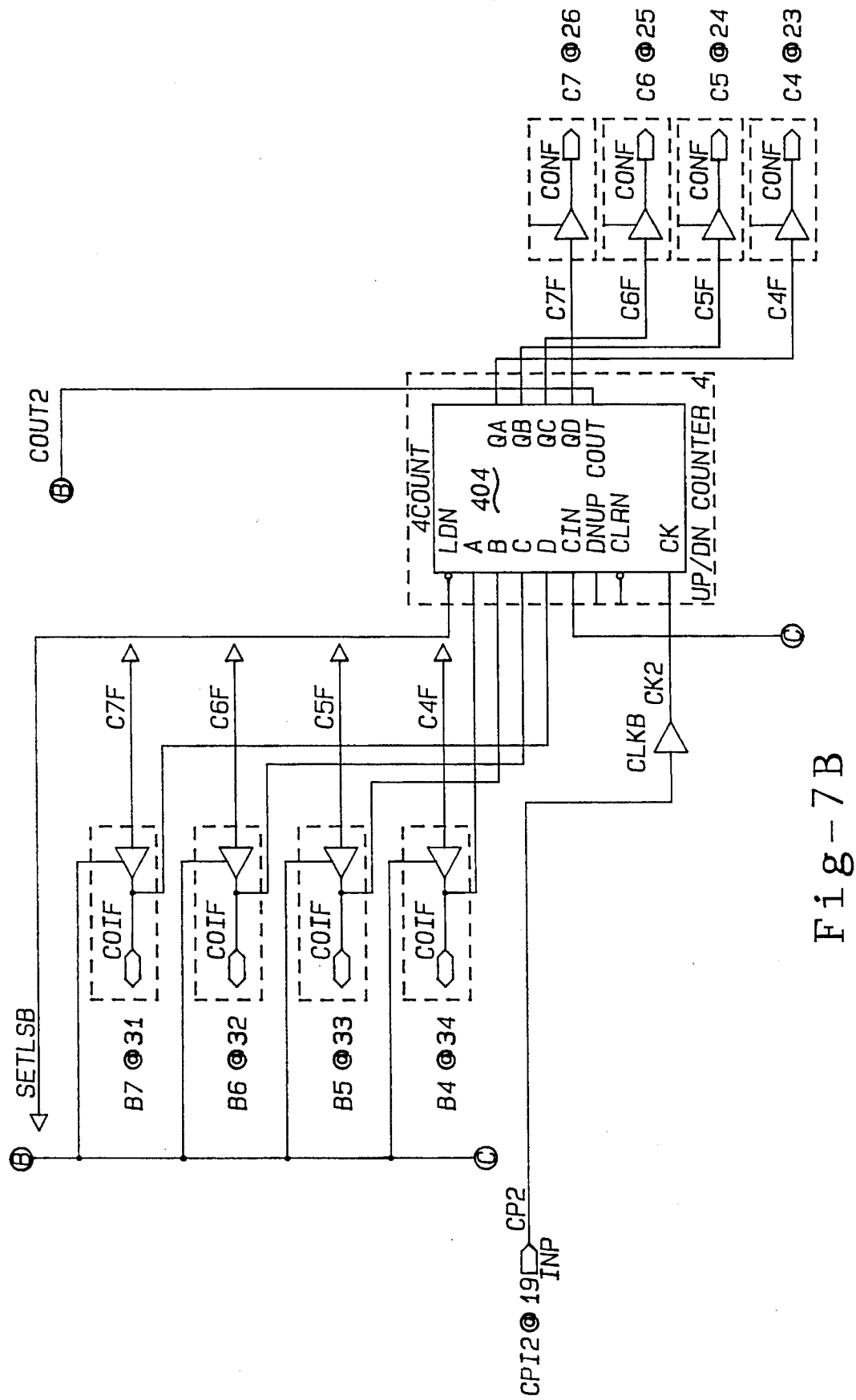
Figure 7C:
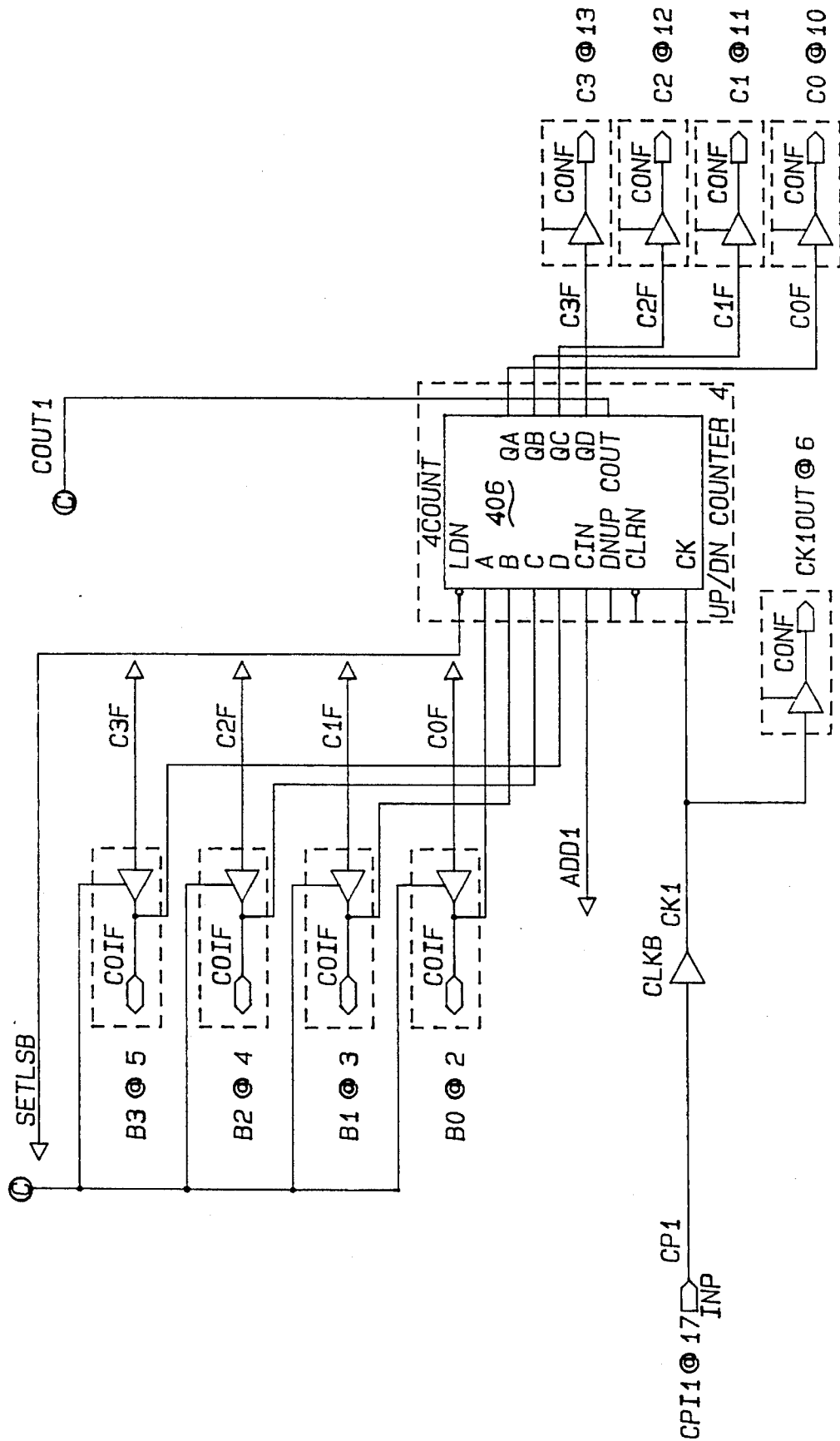
Figure 7D:
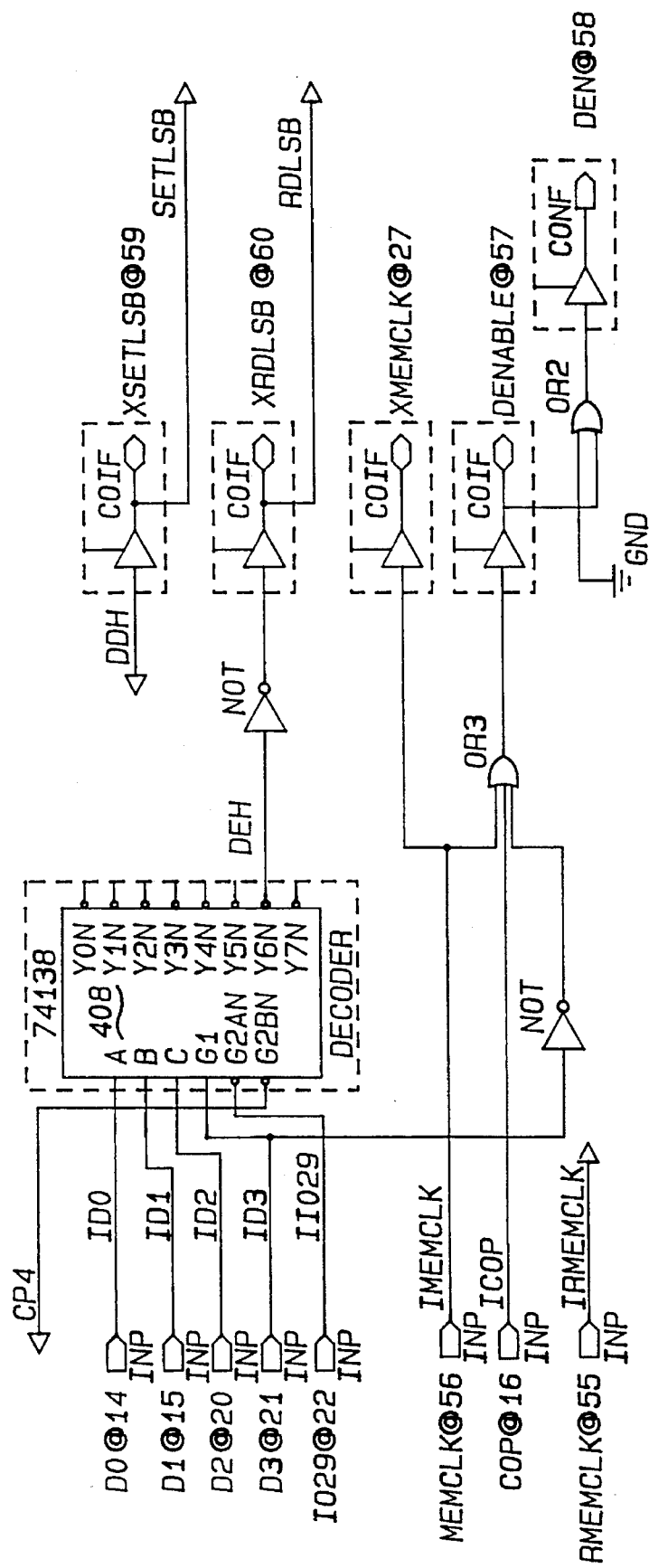
Figure 7E:
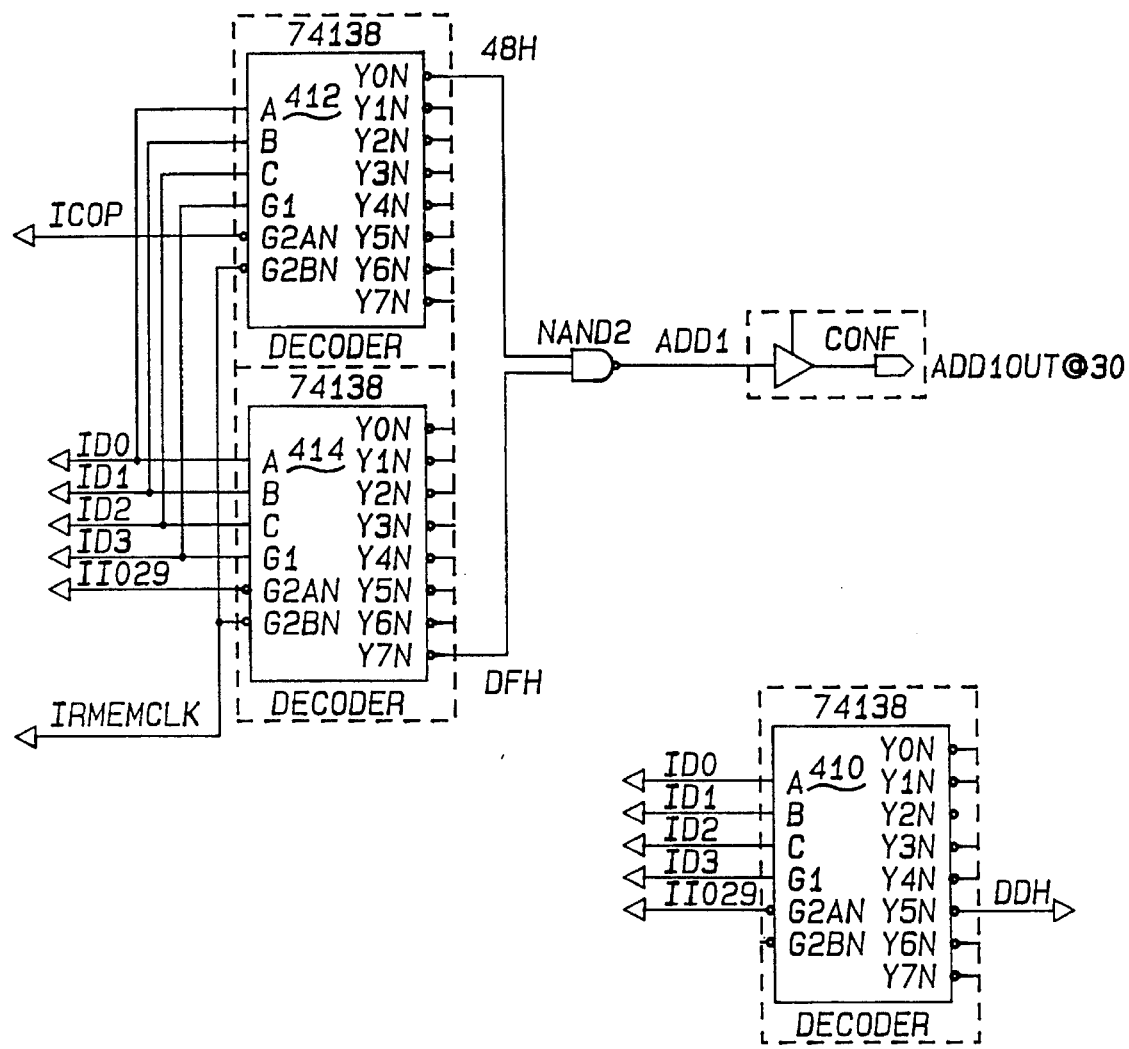

Referring to FIGS. 7–7E, a schematic diagram of the D register 106 (PLDU3) is shown. As in the case of the Q register 102 and the C register 104, the D register 106 includes a set of 4-bit up/down counters 400–406 for specifying the address for the C memory circuit 110. Similarly, the D register 106 includes a set of decoders 408–410 for producing the SETLSB and RDLSB signals. In addition to reading and writing, the D register also includes the capability to increment the current address for the C memory circuit 110 through the ADD1 signal shown in FIG. 7E. This ADD1 signal is detected through the decoders 412–414, and it is transmitted to carry input port of the counter 406.

Referring to FIGS. 8 and 9, two diagrammatic illustrations of the operation of the extended memory system 36 are shown. FIG. 8 specifically illustrates the division of responsibility between the Q memory circuit 108, the P (program) memory circuit 16 and the D (data)memory circuit 14 through the use of a simple "add" subroutine. In this regard, a portion of the "Q list" 500 is shown by identifying an exemplary set of Q memory locations and the data contained therein. For example, the value 3284 is stored at Q memory location A000, while the value 8291 is stored at the next Q memory location A001. A comment box is arranged adjacent to each of these address/data sets in Q memory, so that the significance of the Q list may be seen. In this particular portion of the Q list 500, the CPU 12 has been programmed to add to numbers together. Accordingly, Q memory location A000 is used to store the beginning address for the "ADD" subroutine. The next two Q memory locations are used to identify the address for the two numbers to be added together. In this specific example, two analog constants "AC" will be added together. It should also be noted that these the value of these two analog constants could be readily changed by the programmer without having to recompile the Q list 500. The last Q memory location in this portion of the Q list 500 is the beginning address to a "STORE" subroutine.

FIG. 8 also diagrammatically shows a portion of the program memory 16. This portion of the program memory 16 represents the "ADD" subroutine called from the Q list 500. The first instruction for this subroutine is an instruction to get the first argument address from the Q memory 108. This is accomplished by causing the Q register 102 to increment the current Q memory address by one, and then reading the value on the "B" data bus. As this value represents a memory location in the data memory circuit 14, the next instruction in the program memory is a command to get the data value AC(1) at this data memory location. The ADD subroutine then goes on to get and add the second data value AC(2) to the first data value AC(1), and then return to the next memory location in the Q list 500. FIG. 8 also diagrammatically shows three adjacent memory locations in the data memory 14. In this regard, the data value of 0064 for AC(1) is stored in memory location 8291, while the data value of 00C8 for AC(2) is stored in memory location 8293.

Turning now to FIG. 9, an "AILoop" subroutine is diagrammatically shown in the program memory 16. This particular subroutine takes advantage of an exemplary data structure section shown in the C memory 110. In this example, each analog input signal "AI" is stored in memory as an associated set of four distinct values. Thus, the signal set for the analog input signal AI(1) includes a "field" value which represents the raw signal received by the CPU 12, a "voltage" value which represents a processed value of the field signal, a scaling factor and a scaled version of the processed signal. In any event, it should be understood that a plurality of analog input signals need to be stored in memory, a this exemplary data structure is used to store these values in adjacent groups of four. As a result, the variable incrementing capability of the C register 104 is utilized in the AILoop subroutine in order to cause each analog input "field" signal value to be read and then stored in successively spaced locations in C memory 110. More specifically, the ADD4 command signal is utilized to increment the C memory 110 by the integer value of four as each analog input "field" signal is to be stored. This is shown by the "STAC4" instruction in the program memory at memory address AA15. As a result, it should be appreciated that minimal processing overhead is needed in order to read and store many signal values in the C memory 110.

The present invention has been described in an illustrative manner. In this regard, it is evident that those skilled in the art once given the benefit of the foregoing disclosure, may now make modifications to the specific embodiments described herein without departing from the spirit of the present invention. Such modifications are to be considered within the scope of the present invention which is limited solely by the scope and spirit of the appended claims.

What is claimed is:

1. An extended memory system in a computer having a central processing unit, a data memory, a program memory, a first communication path between said central processing unit and said program memory, and a separate second communication path between said central processing unit and said data memory, said extended memory system comprising:

first storage means for containing an ordered sequence of program memory addresses, where each of said program memory addresses is associated with a distinct set of instructions which are, in turn, contained in said program memory; and second storage means for containing a series of related data value sets, said second storage means including at least one memory unit and logic means, said logic means including a plurality of registers which are capable of separately and alternatively addressing said second storage means, said logic means providing a plurality of programmable address increments for each said memory unit, said programmable address increments including at least an increment by one, an increment by two, an increment by four, and an increment by an integer greater than one, said logic means further including an address register, which in turn includes at least one decoder for detecting an address increment signal retrieved from said program memory by said central processing unit, said address increment signal determining a magnitude of said programmable address increment for said second storage means;

said first and second storage means each being connected to a data bus associated with said separate second communication path for said data memory.

2. The invention according to claim 1, wherein said program memory contains at least one instruction set which represents a particular programmed procedure, each said instruction set having a first instruction, said first instruction having a first instruction address, and wherein said first storage means includes at least one memory unit for containing said program memory addresses, each of said program memory addresses having a value identical to the first instruction address.

3. The invention according to claim 2, wherein said memory unit of said first storage means includes a data memory address in said data memory of an argument for at least one of said programmed procedures.

4. The invention according to claim 2, wherein said memory unit of said first storage means includes an argument address in said second storage means of an argument for at least one of said programmed procedures.

5. The invention according to claim 1, wherein said program memory includes both volatile and non-volatile memory circuits.

6. The invention according to claim 1, wherein said logic means includes a control register, which in turn includes a buffer circuit which enables a current address output from said control register to be read on said data bus.

7. An extended memory system in a computer having a central processing unit, a data memory, a program memory, a first communication path between said central processing unit and said program memory, and a separate second communication path between said central processing unit and said data memory, said extended memory system comprising:

value storage means for containing a series of related data value sets, said value storage means being connected to a data bus associated with said separate second communication path for said data memory, said value storage means including at least one memory unit and logic means, said logic means including a plurality of registers which are capable of separately and alternatively addressing said value storage means, said logic means providing a plurality of programmable address increments for each said memory unit, said programmable address increments including at least an increment by one, an increment by two, an increment by four, and an increment by an integer greater than one, said logic means further including a control register, which in turn includes at least one decoder for detecting an address increment signal retrieved from said program memory by said central processing unit, said address increment signal determining a magnitude of said programmable address increment for said value storage means.

8. The invention according to claim 7, wherein said related data value sets form part of a data structure.

9. The invention according to claim 7, wherein said logic means includes a control register which is capable of causing a data value to be stored at a predetermined address location in said value storage means and then a current address of said value storage means to be incremented by an integer greater than one from a single instruction retrieved from said program memory.

* * * * *